(12) United States Patent
Kawasaki

(10) Patent No.: US 7,474,609 B2
(45) Date of Patent: Jan. 6, 2009

(54) FREQUENCY-DIVISION MULTIPLEXING TRANSCEIVE APPARATUS AND METHOD

(75) Inventor: Toshio Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 589 days.

(21) Appl. No.: 11/319,377

(22) Filed: Dec. 29, 2005

(65) Prior Publication Data

US 2007/0070968 A1    Mar. 29, 2007

(30) Foreign Application Priority Data

Sep. 29, 2005    (JP)    ............................. 2005-283288

(51) Int. Cl.
    *H04J 11/00*    (2006.01)
    *H04B 7/208*    (2006.01)
    *H04L 27/00*    (2006.01)
(52) U.S. Cl. ...................... 370/203; 370/344; 370/295
(58) Field of Classification Search ................ 370/203, 370/215, 344; 375/140, 141, 145, 146, 295, 375/303
    See application file for complete search history.

(56) References Cited

U.S. PATENT DOCUMENTS

| 6,173,006 | B1 * | 1/2001 | Kent et al. ................... 375/145 |
| 2004/0156386 | A1 | 8/2004 | Atarashi et al. | |
| 2007/0025430 | A1 * | 2/2007 | Rasmussen ................. 375/150 |
| 2007/0189414 | A1 * | 8/2007 | Kawasaki ................... 375/295 |
| 2007/0189415 | A1 * | 8/2007 | Kawasaki ................... 375/295 |

OTHER PUBLICATIONS

Goto, Y., Kawamura, T., Atarashi, H. and Sawahashi, M. (IP Radio Network Development Dept., NTT DoCoMo, Inc., Japan). "Investigations on Packet Error Rate of Variable Spreading and Chip Repetition Factors (VSCRF)-CDMA Wireless Access in Reverse Link Multi-cell Environment," Technical Report of The Institute of Electronics, Information and Communication Engineers (IEICE), RCS2004-84, Jun. 2004, pp. 49-54 (with English translation 6 pgs.).

* cited by examiner

*Primary Examiner*—Aung S Moe
*Assistant Examiner*—Feben Haile
(74) *Attorney, Agent, or Firm*—Myers Wolin, LLC

(57) ABSTRACT

In a frequency-division multiplexing transmitting apparatus for transmitting data at a frequency specific to a mobile station, a symbol compression and repetition unit compresses the time domain of each symbol of a transmit symbol sequence, repeats the symbol a prescribed number of times (L times) and rearranges the symbols of the obtained repetitive symbol sequence in such a manner that the symbols will have an arrangement identical with the arrangement of the transmit symbol sequence; a phase rotating unit applies phase rotation, which varies at a speed specific to the mobile station, to each symbol of the repetitive symbol sequence after the rearrangement thereof; and a transmitting unit transmits the symbols that have undergone the phase rotation. The phase rotating unit varies the amount of phase rotation, which is applied to each symbol of the repetitive symbols, in increments of $k \cdot 2\pi/L$ (where k represents an integer specific to the mobile station) at the period of the repetitive symbol sequence.

14 Claims, 21 Drawing Sheets

FIG. 3
(a) FREQUENCY SPECTRUM
(k=1, f=1/(L×Tc))
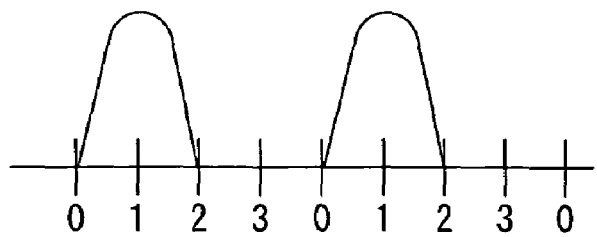
(b) FREQUENCY SPECTRUM
(k=2, f=2/(L×Tc))
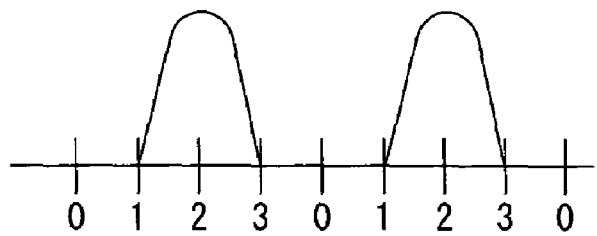
(c) FREQUENCY SPECTRUM
(k=3, f=3/(L×Tc))
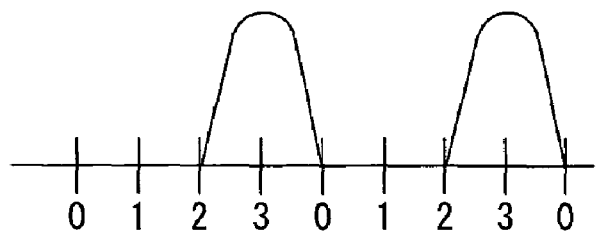
(d) FREQUENCY SPECTRUM
(k=0, f=0)
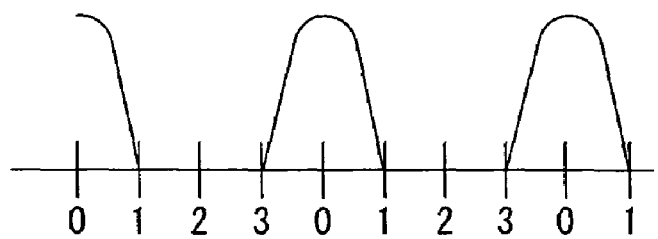

FREQUENCY-DIVISION MULTIPLEXING TRANSCEIVE APPARATUS AND METHOD

BACKGROUND OF THE INVENTION

This invention relates to a frequency-division multiplexing transceive apparatus and method for sending and receiving data by a mobile-station-specific frequency spectrum. More specifically, the invention relates to a frequency-division multiplexing transceive apparatus and method for transmitting a transmit symbol upon subjecting the symbol to phase rotation that varies at a speed specific to a mobile station.

DS-CDMA (Direct Sequence-Code Division Multiple Access) multiplies a narrow-band transmit signal by a spreading code to thereby transmit the signal upon spreading it over a wider band. When each of a number of mobile stations sends a transmit signal upon multiplying it by a spreading code having a spreading factor SF in DS-CDMA, the information transmission speed is 1/SF. In order to achieve a frequency utilization efficiency equivalent to that of TDMA, therefore, it is required with DS-CDMA that the number of signals accommodated be equal to SF-number of mobile stations. However, in an actual radio propagation environment on the uplink, the influence of MAI (Multiple Access Interference), in which the signals from each of the mobile stations interfere with one another, becomes dominant owing to disparities in propagation conditions from each mobile station to the base station, e.g., disparities in propagation delay time or propagation-path fluctuation. The result is a decline in rate of frequency utilization.

IFDMA (Interleaved Frequency-Division Multiple Access) is being studied as a radio modulation scheme capable of diminishing the influence of MAI in next-generation mobile communications [see the specification of JP2004-297756 and "Investigations on Packet Error Rate of Variable Spreading and Chip Repetition Factors (VSCRF)-CDMA Wireless Access in Reverse Link Multi-cell Environment", The Institute of Electronics, Information and Communication Engineers). This IFDMA modulating scheme transmits a transmit signal upon multiplying the signal by a phase the change in speed of which is specific to the mobile station, thereby reducing MAI by placing the signals from each of the mobile stations on a frequency axis in such a manner that the signals will not overlap one another on the frequency axis.

FIG. 16 is a block diagram illustrating the structure of a mobile station that employs an IFDMA modulating scheme, and FIG. 17 is a diagram useful in describing an IFDMA symbol. A channel encoder $1a$ performs channel encoding by applying error-correcting encoding such as turbo encoding or convolutional encoding to an entered binary information sequence, and a serial-to-parallel converter (a data modulator) $1b$ converts the channel-encoded data to, e.g., I, Q complex components (symbols) in QPSK by a serial-to-parallel conversion. A symbol transmitted in one frame of IFDMA is referred to as an "IFDMA symbol". One IFDMA symbol is composed of Q-number of symbols S0, S1, S2 and S3 (Q=4 holds in this illustration), as illustrated at (a) of FIG. 17.

A symbol compression and repetition unit $1c$ compresses the time domains of the four symbols S0, S1, S2 and S3 that constitute the IFDMA symbol and repeatedly generates each symbol L times (L=4 in the illustration). In addition, the symbol compression and repetition unit $1c$ rearranges the repeatedly generated symbols and places them in the same arrangement as that of the symbol sequence S0, S1, S2, S3 [see (b) of FIG. 17].

One symbol that is the result of compressing the time domain is referred to as a sample (and is also referred to below as a symbol in the repetitive symbol sequence). If we let Tc represent the sample period, the period Ts of symbol repetition will satisfy the relation Ts=Tc×Q. A phase rotating unit $1d$ has a complex multiplier CML that subjects each symbol in the repetitive symbol sequence to user-dependent phase rotation [see (c) of FIG. 17]. A radio transmitter $1e$ up-converts the frequency of the signal, which enters from the phase rotating unit $1d$, from baseband frequency to radio frequency, subsequently amplifies the radio-frequency signal and transmits the resultant signal from an antenna.

When the time domains of the transmit-symbol sequence S0, S1, S2, S3 are compressed, each transmit symbol is repeatedly generated a prescribed number (L) of times and the symbols of the repetitive symbol sequence are rearranged so as to have an arrangement identical with that of the symbol sequence S0, S1, S2, S3, the repetitive symbol sequence after rearrangement will have a a comb tooth-shaped spectrum, as illustrated at (a) of FIG. 18. If each symbol in the repetitive symbol sequence after the rearrangement is subjected to phase rotation that varies at a speed that is specific to the mobile station, the spectral positions of the a comb tooth-shaped spectrum will shift, as indicated at (a) to (d) of FIG. 18, and frequency-division multiplex transmission becomes possible. That is, if the speed of phase rotation is zero, the frequency spectrum of the output signal of phase rotating unit $1d$ will exhibit the a comb tooth-shaped spectrum characteristic shown at (a) of FIG. 18. As the amount of change (frequency) of phase rotation per unit time Tc increases, the frequency spectrum shifts as indicated at (a) to (d) of FIG. 18. It should be noted that W represents the symbol frequency.

An NCO (Numerically Controlled Oscillator) $1g$ calculates a phase rotation amount θ every unit time Tc, and the complex multiplier CML of the phase rotating unit $1d$ executes frequency shift processing by subjecting each symbol in the repetitive symbol sequence to phase rotation that is specific to the mobile station.

A phase $\theta_k(t)$ that is output from the NCO $1g$ when Q-number of symbols have been repeated L times is represented by the following equation:

$$\theta_k(t) = k \cdot 2\pi \frac{W}{L} \cdot t = k \cdot 2\pi \frac{1}{L \cdot Q \cdot Tc} \cdot t \qquad (1)$$

$$W = \frac{1}{Ts} QW = \frac{1}{Tc}$$

where k, which represents a value that corresponds to the mobile station, is any one value among 0, 1, 2, ... L−1. The NCO $1g$ outputs the phase $\theta_k(t)$, which has been calculated according to Equation (1), at the period Tc and is so adapted that the amount of phase rotation will be 2π at the IFDMA period (=16Tc) (i.e., such that the phase will make one full cycle).

The NCO $1g$ includes a frequency-shift setting unit $1h$ for setting the amount of change (angular speed) ω every unit time Tc. Using the parameters k, L and Q, the frequency-shift setting unit $1h$ calculates and outputs the angular speed ω according to the following equations:

$$\varpi = k \cdot 2\pi \frac{W}{L} = k \cdot 2\pi \frac{1}{L \cdot Q} \qquad (2)$$

-continued $$f = \frac{\varpi}{2\pi \cdot Tc} = \frac{k}{L \cdot Q \cdot Tc}$$

A rotation-phase amount deciding unit 1i in NCO 1g has an adder ADD and a delay unit DLY for applying a delay time T (=Tc). The deciding unit 1i performs a calculation according to the following equation every unit time Tc:

$$\theta(t+1) = \theta(t) + \omega \quad (3)$$

increases the phase-rotation amount θ in increments of ω and outputs the result. A converter 1j calculates I, Q components (x,y) in a complex plane of phase-rotation amount θ and inputs these components to the phase rotating unit 1d. If symbols constituting the repetitive symbol sequence are represented by S (=X+jY), then the phase rotating unit 1d performs a calculation according to the following expression:

(X+jY)×(x+jy)

and outputs the result of calculation. In actuality, the complex multiplier CML of the phase rotating unit 1d calculates and outputs (Xx−Yy), (Yy+Yx) for every real-number and imaginary-number part.

If k=0 holds, the amount f of frequency shift will be zero (f=0) and therefore the frequency spectrum will be as indicated at (a) of FIG. 18. If k=1 holds, then the amount f of frequency shift will be 1/(L×Q×Tc) according to Equation (2). If Q=L=4 holds, the phase changes in increments of π/8, as indicated at (c) of FIG. 19, and the frequency spectrum becomes as indicated at (d) of FIG. 19 or (b) of FIG. 18. As a result, even if a plurality of mobile station access the same base station simultaneously, the frequency spectrum of each mobile station will be orthogonal frequencies and interference among the transmit signals can be reduced.

FIG. 20 is another block diagram of a mobile station that employs an IFDMA modulating scheme, and FIG. 21 is a diagram useful in describing the operation of transmission with IFDMA modulation. The mobile station shown in FIG. 20 spreads transmit symbols by a spreading code, compresses and repeats the time domains of the spread chip sequence obtained by such spreading and rotates the phase of the obtained repetitive chip sequence every unit time Tc.

The channel encoder 1a performs channel encoding by applying error-correcting encoding such as turbo encoding or convolutional encoding to an entered binary information sequence, and the serial-to-parallel converter (a data modulator) 1b converts the channel-encoded data to, e.g., I, Q complex components (symbols) in QPSK by a serial-to-parallel conversion. One IFDMA symbol is composed of Q-number of symbols (Q=2 holds in this illustration), as illustrated at (a) of FIG. 21.

A spreading code multiplier 1m multiplies the symbols S0, S1 by spreading codes c00, c01, c10, c11 of spreading factor SF (SF=2 in this illustration) to thereby generate a spread chip sequence [(b) in FIG. 21]. As a result, one IFDMA symbol is composed of Q (=4) chips.

A chip compression and repetition unit 1n compresses the time domains of the four chips c00, c01, c10 and c11 that constitute the spread chip sequence and repeatedly generates each chip CRF times (CRF=4 in the illustration). In addition, the chip compression and repetition unit 1n rearranges the repetitive chip sequence and makes the sequence the same as the original chip sequence c00, c01, c10, c11 [see (c) and (d) of FIG. 21]. Here the number CRF of iterations stands for Chip Repetition Factor. If Tc represents the chip period, then the period Ts of the repetitive chip sequence is Tc×Q×SF.

The phase rotating unit 1d uses the complex multiplier CML to subject the repetitive chip sequence to user-dependent phase rotation [see (e) of FIG. 21]. The radio transmitter 1e up-converts the frequency of the input signal from baseband frequency to radio frequency, subsequently amplifies the radio-frequency signal and transmits the resultant signal from the antenna.

If the speed of phase rotation is zero, the frequency spectrum of the output signal of phase rotating unit 1d will exhibit a characteristic of the kind shown at (a) of FIG. 18. As the amount of change (frequency) of phase rotation per unit time Tc increases, the frequency spectrum shifts as indicated at (a) to (d) of FIG. 18.

The NCO 1g calculates the phase rotation amount θ every unit time Tc, and the complex multiplier CML of the phase rotating unit 1d executes frequency shift processing by subjecting each chip in the repetitive chip sequence to phase rotation that is specific to the mobile station. Phase $\theta_k(t)$ that is output from the NCO 1g when Q-number of chips have been repeated CRF times is represented by the following equation:

$$\theta_k(t) = k \cdot 2\pi \frac{W}{CRF} \cdot t = k \cdot 2\pi \frac{1}{CRF \cdot SF \cdot Q \cdot Tc} \cdot t \quad (4)$$

$$W = \frac{1}{Ts} SF \cdot Q \cdot W = \frac{1}{Tc}$$

where k, which represents a value that corresponds to the mobile station, is any one value among 0, 1, 2, ... CRF−1. The NCO 1g outputs the phase $\theta_k(t)$, which has been calculated according to Equation (4), at the period Tc and is so adapted that the amount of phase rotation will be 2π at the IFDMA period (=16Tc) (i.e., such that the phase will make one full cycle).

The frequency-shift setting unit 1h of the NCO 1g sets the amount of change (angular speed ω) every unit time Tc. Using the parameters k, CRF, Q and SF, the frequency-shift setting unit 1h calculates and outputs the angular speed ω according to the following equations:

$$\varpi = k \cdot 2\pi \frac{W}{CRF} = k \cdot 2\pi \frac{1}{CRF \cdot SF \cdot Q} \quad (5)$$

$$f = \frac{\varpi}{2p \cdot Tc} = \frac{k}{CRF \cdot SF \cdot Q \cdot Tc}$$

The rotation-phase amount deciding unit 1i, which has the adder ADD and the delay unit DLY for applying the delay time T (=Tc), performs a calculation according to the following equation every unit time Tc:

$$\theta(t+1) = \theta(t) + \omega$$

increases the phase-rotation amount θ in increments of ω and outputs the result. The converter 1j calculates I, Q components (x,y) in a complex plane of phase-rotation amount θ and inputs these components to the phase rotating unit 1d. The phase rotating unit 1d executes frequency shift processing by subjecting each chip of the repetitive chip sequence to phase rotation that is specific to the mobile station.

Thus, if k=0 holds, the amount f of frequency shift will be zero (f=0) and therefore the frequency spectrum will be as indicated at (a) of FIG. 18. If k=1 holds, then the amount f of frequency shift will be 1/(CRF×SF×Q×Tc) according to Equation (5). If Q=SF=2, CRF=4 holds, the phase changes in increments of π/8 and the frequency spectrum becomes as indicated at (b) of FIG. 18. Further, if k=2 holds, then the amount f of frequency shift will be 2/(CRF×SF×Q×Tc) according to Equation (5). If Q=SF=2, CRF=4 holds, the phase changes in increments of π/4 every Tc and the frequency spectrum becomes as indicated at (c) of FIG. 18. Further, if k=3 holds, then the amount f of frequency shift will be 3π/(CRF×SF×Q×Tc) according to Equation (5). If Q=SF=2, CRF=4 holds, the phase changes in increments of 3π/4 every Tc and the frequency spectrum becomes as indicated at (d) of FIG. 18. As a result, even if a plurality of mobile station access the same base station simultaneously, the frequency spectrum of each mobile station will be orthogonal frequencies and interference among the transmit signals can be reduced.

In the examples of the prior art, complex multiplication for performing phase rotation is carried out for every symbol of the repetitive symbol sequence or for every chip of the repetitive chip sequence in order to implement a frequency shift that is specific to the mobile station. As a consequence, a precise resolution is required for phase and a large amount of calculation is involved in phase rotation. For example, if the number of symbols constituting one IFDMA symbol is Q=4 and the number of iterations is L=4 in FIG. 16, or if the number of symbols constituting one IFDMA symbol is Q=2, and spreading factor is SF=2 and the number of chip iterations is CRF=4 in FIG. 20, then the resolution will be $$\theta_k(t_c) = k \cdot 2\pi \frac{W}{L} t_c = k \cdot 2\pi \frac{1}{16} t_c$$

or $$\theta_k(t_c) = k \cdot 2\pi \frac{W}{CRF} t_c = k \cdot 2\pi \frac{1}{16} t_c$$

and 16 phase rotations will be required over the period of the IFDMA symbol (the frame period). The larger the number of iterations, the larger the number of symbols or the larger the spreading factor, the lower the resolution, the greater the amount of calculation and the greater the power consumption of the frequency-division multiplexing transmitting unit, e.g., mobile station. Although the foregoing is for the case of a transmitting unit, the amount of processing is great and the amount of power consumption large also in the case of a receiving unit.

SUMMARY OF THE INVENTION

Accordingly, an object of the present invention is to reduce the number of times the amount of phase rotation is calculated in IFDMA modulation/demodulation.

First Frequency-division Multiplexing Transceive Apparatus and Method

A first frequency-division multiplexing transmitting apparatus according to the present invention includes a symbol compression and repetition unit, a phase rotating unit and a transmitting unit. The symbol compression and repetition unit compresses a time domain of each symbol of a transmit symbol sequence, repeats the symbol a prescribed number of times (L times) and rearranges the symbols of the obtained repetitive symbol sequence in such a manner that the symbols will have an arrangement identical with the arrangement of the transmit symbol sequence. The phase rotating unit applies phase rotation, which varies at a speed specific to the mobile station, to each symbol of the repetitive symbol sequence after the rearrangement thereof, and the transmitting unit transmits the symbols that have undergone the phase rotation. In the rotation of phase, the phase rotating unit varies the amount of phase rotation, which is applied to each symbol of the repetitive symbols, in increments of k·2π/L (where k represents an integer specific to the mobile station) at the period of the repetitive symbol sequence.

A first frequency-division multiplexing transceive apparatus of the present invention includes a receiving unit, a phase rotating unit and a demodulator. The receiving unit receives each symbol of a repetitive symbol sequence that has been transmitted from the transmitting apparatus, the phase rotating unit, for every mobile station, subjects the receive symbols to phase rotation that varies in increments of k·2π/L (where k represents an integer specific to the mobile station) at the period of the repetitive symbol sequence, and the demodulator demodulates the transmit symbols by combining identical symbol components that are output from the phase rotating unit at the period of the repetitive symbol sequence.

Second Frequency-division Multiplexing Transceive Apparatus and Method

A second frequency-division multiplexing transmitting apparatus according to the present invention includes a spreading unit, a chip compression and repetition unit and a transmitting unit. The spreading unit multiplies transmit symbols by spreading codes to thereby generate a chip sequence. The chip compression and repetition unit compresses a time domain of each chip of the chip sequence, repeats the chip a prescribed number (=CRF) of times and rearranges the chips of the repetitive chip sequence in such a manner that the chips will have an arrangement identical with the original chip arrangement. The phase rotating unit subjects each chip of the repetitive chip sequence after the rearrangement thereof to phase rotation, which varies at a speed specific to the mobile station, and the transmitting unit transmits the output of the phase rotating unit. In the rotation of phase, the phase rotating unit varies the amount of phase rotation, which is applied to each chip of the repetitive chip sequence, in increments of k·2π/CRF (where k represents an integer specific to the mobile station) at the period of the repetitive chip sequence.

A second frequency-division multiplexing transceive apparatus of the present invention includes a receiving unit, a phase rotating unit, a despreading unit and a demodulator. The receiving unit receives each chip of a repetitive chip sequence that has been transmitted from the transmitting apparatus, the phase rotating unit, for every mobile station, subjects the receive chips to phase rotation that varies in increments of k·2π/CRF at the period of the repetitive chip sequence, the despreading unit compresses time domains of despreading codes, thereby repeatedly generating the despreading codes the prescribed number of times (=CRF), and applies the repeatedly generated despreading codes to the output of the phase rotating unit, and the demodulator demodulates the transmit symbols by combining identical symbol components that have been obtained by the despreading.

Third Frequency-division Multiplexing Transceive Apparatus and Method

A third frequency-division multiplexing transmitting apparatus according to the present invention includes a phase rotating unit, a spreading unit and a transmitting unit. The phase rotating unit applies phase rotation, which varies at a speed specific to the mobile station, to transmit symbols, the spreading unit compresses time domains of spreading codes, thereby repeatedly generating the spreading codes a prescribed number of times (=CRF), and multiplies the output of the phase rotating unit by the repeatedly generated spreading codes, and the transmitting unit transmits the results of multiplication by the spreading codes. In the rotation of phase, the phase rotating unit varies the amount of phase rotation, which is applied to the transmit symbols, in increments of $k \cdot 2\pi/\text{CRF}$ (where k represents an integer specific to the mobile station) at the period of the repetitive spreading code sequence.

A third frequency-division multiplexing transceive apparatus of the present invention includes a receiving unit, a despreading unit, a phase rotating unit and a demodulator. The receiving unit receives the signal that has been transmitted from the transmitting apparatus, the despreading unit compresses time domains of despreading codes, thereby repeatedly generating the despreading codes the prescribed number (=CRF) of times, and multiplies the receive signal by the repetitive despreading codes, the phase rotating unit, for every mobile station, subjects the output of the despreading unit to phase rotation that varies in increments of $k \cdot 2\pi/\text{CRF}$ at the period of the repetitive spreading code sequence, and the demodulator demodulates the transmit symbols by combining identical symbol components from among the outputs of the phase rotating unit.

In accordance with the first frequency-division multiplexing transmitting method and frequency-division multiplexing transmitting apparatus of the present invention, the amount of phase rotation applied to each symbol of a repetitive symbol sequence is varied in increments of $k \cdot 2\pi/L$ (where k represents an integer specific to the mobile station) at the period $Ts=Tc \times Q$ (where Tc is the sample period of the repetitive symbol sequence) of the repetitive symbol sequence, where Q represents the number of transmit symbols transmitted in one frame period and L represents the number of iterations. This means that the amount of computation can be reduced to 1/Q in comparison with the prior-art examples in which phase rotation computations are performed in increments of $k \cdot 2\pi/Q \times L$. As a result, the power consumed by the frequency-division multiplexing transmitting apparatus can be reduced. Further, since it will suffice to subject receive symbols to phase rotation that varies in increments of $k \cdot 2\pi/L$-at the period $Ts=Tc \times Q$ of the repetitive symbol sequence also in frequency-division multiplexing reception, computation can be reduced to 1/Q and the power consumed by the frequency-division multiplexing transmitting apparatus can be reduced in comparison with the prior-art examples.

Further, in accordance with the second frequency-division multiplexing transmitting method and frequency-division multiplexing transmitting apparatus of the present invention, the amount of phase rotation applied to each chip of a repetitive chip sequence is varied in increments of $k \cdot 2\pi/\text{CRF}$ (where k represents an integer specific to the mobile station) at the period $Ts=Tc \times Q \times SF$ (where Tc is the chip period) of the repetitive chip sequence, where Q represents the number of symbols transmitted in one frame period, SF the spreading factor and CRF the number of iterations. This means that in comparison with the prior-art examples, the amount of computation can be reduced to 1/Q and the power consumed by the frequency-division multiplexing transmitting apparatus can be reduced. Further, since it will suffice to subject receive chips to phase rotation that varies in increments of $k \cdot 2\pi/\text{CRF}$ at the period of the repetitive chip sequence also in frequency-division multiplexing reception, computation can be reduced to 1/Q and the power consumed by the frequency-division multiplexing transmitting apparatus can be reduced in comparison with the prior-art examples.

Further, in accordance with the third frequency-division multiplexing transmitting method and frequency-division multiplexing transmitting apparatus of the present invention, it will suffice to calculate the amount of phase rotation at the intervals of the period Ts ($=Tc \times Q \times SF$) of the repetitive spreading code sequence. In comparison with the prior-art examples, therefore, computation can be reduced to 1/Q and the power consumed by the frequency-division multiplexing transmitting apparatus can be reduced. Further, in accordance with the frequency-division multiplexing transmitting apparatus of the present invention, complex multiplication of phase rotation can be implemented by calculation every Ts ($=Tc \times Q \times SF$). In comparison with the second embodiment in which complex multiplication of phase rotation is performed at intervals of the period Tc, the amount of computation can be reduced to $1/Q \times SF$. Further, in accordance with the frequency-division multiplexing transmitting apparatus of the present invention, the complex multiplier of the spreading unit can be implemented in simple fashion using a selector. Furthermore, in frequency-division multiplexing reception as well, it will suffice to subject the despread output to phase rotation that varies in increments of $k \cdot 2\pi/\text{CRF}$ at the period Ts of the repetitive spreading code sequence. In comparison with the prior art, therefore, the amount of computation can be reduced and so can the power consumption of the frequency-division multiplexing transmitting apparatus.

Other features and advantages of the present invention will be apparent from the following description taken in conjunction with the accompanying drawings.

BRIEF DESCRIPTION OF THE DRAWINGS

FIG. 3 is a diagram useful in describing frequency spectra;

DESCRIPTION OF THE PREFERRED EMBODIMENTS

Figure 1:
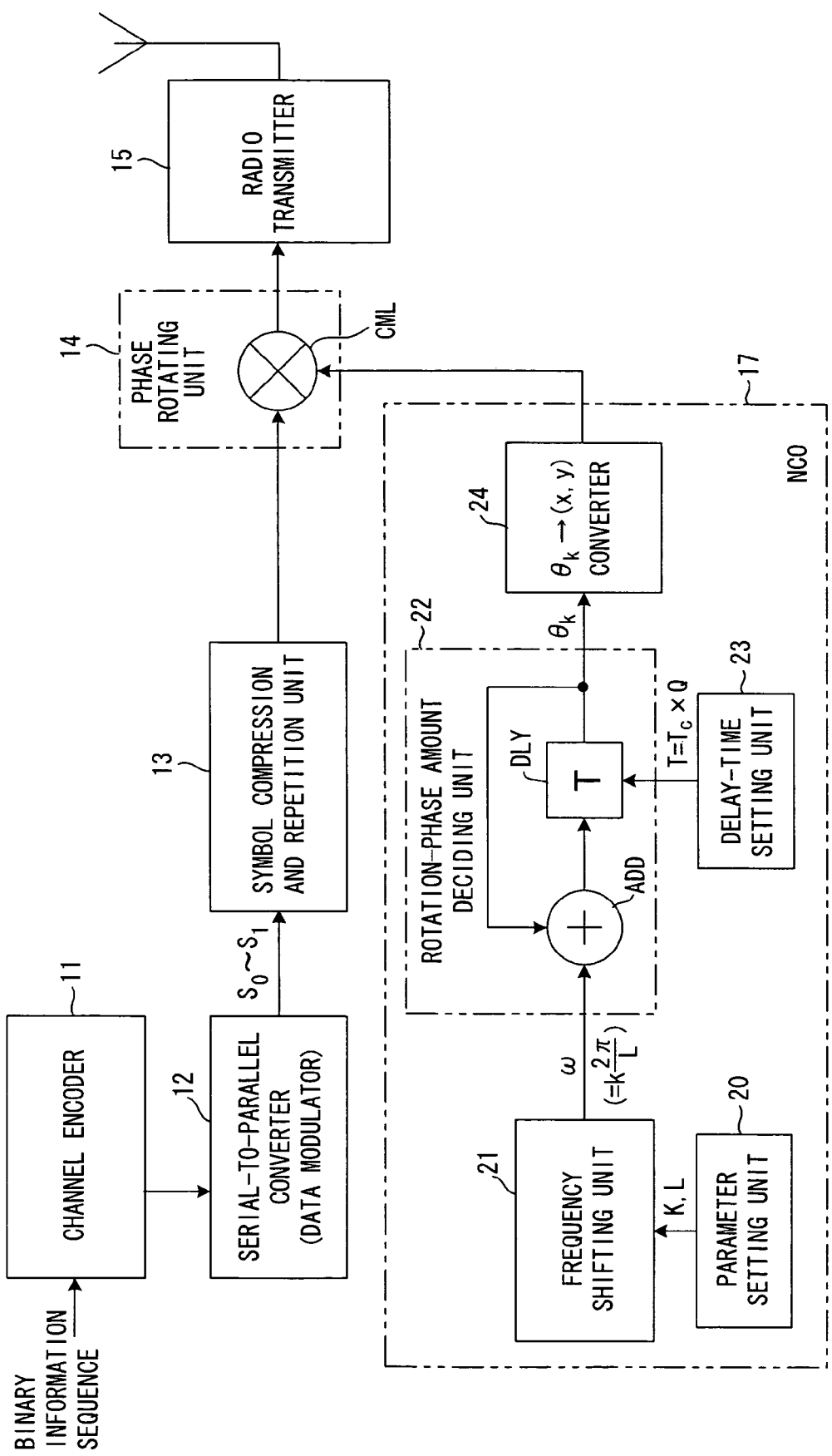
FIG. 1 is a block diagram illustrating a frequency-division multiplexing transmitting apparatus according to a first embodiment of the present invention.
Figure 2:
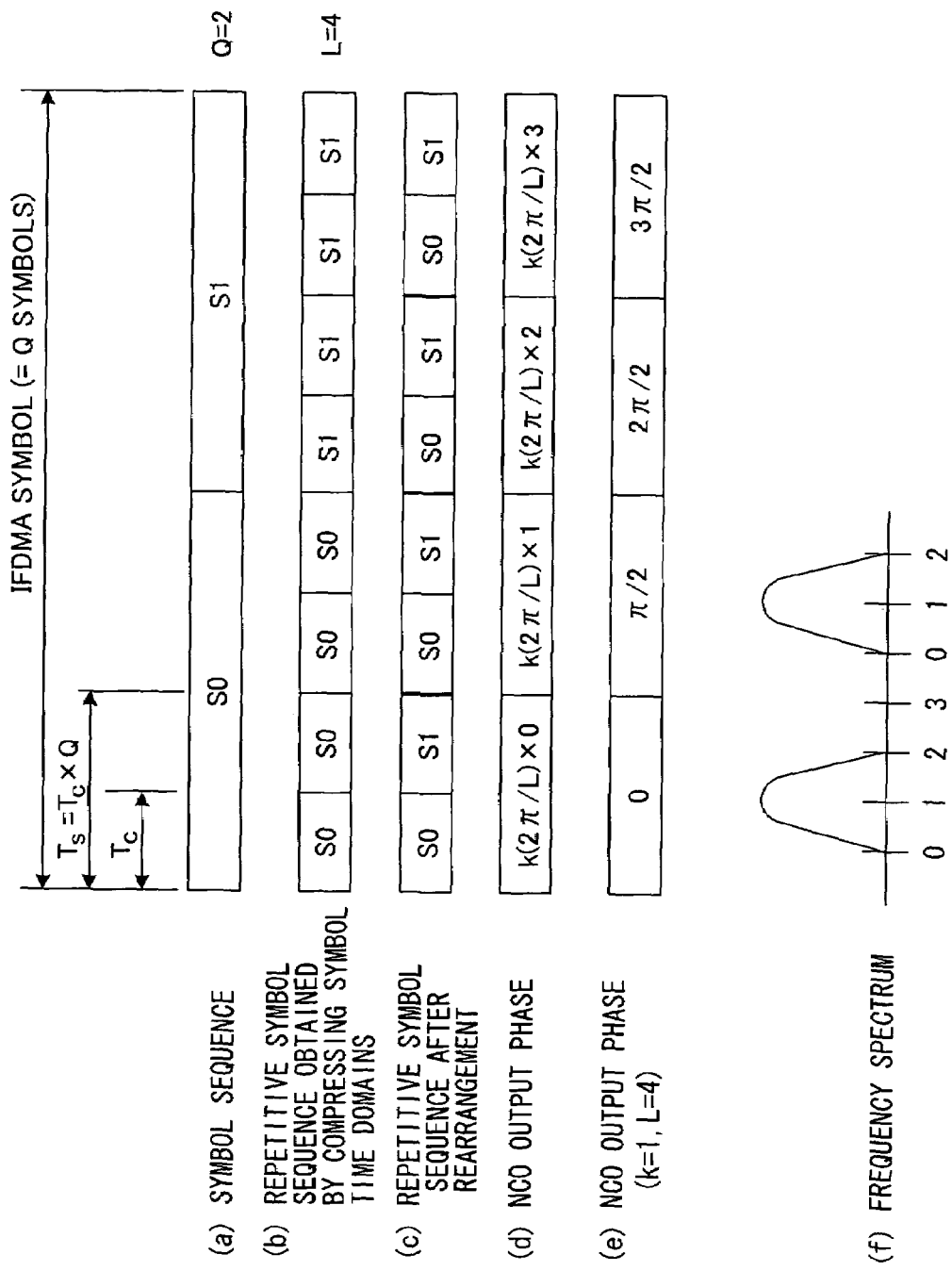
FIG. 2 is a diagram useful in describing the operation of the frequency-division multiplexing transmitting apparatus.

(A) First Embodiment (a) Frequency-division Multiplexing Transmitting Apparatus FIG. 1 is a block diagram illustrating a frequency-division multiplexing transmitting apparatus according to a first embodiment of the present invention, FIG. 2 is a diagram useful in describing the operation of the frequency-division multiplexing transmitting apparatus, and FIG. 3 is a diagram useful in describing frequency spectra. The frequency-division multiplexing transmitting apparatus can be utilized as a mobile station.

A channel encoder 11 performs channel encoding by applying error-correcting encoding such as turbo encoding or convolutional encoding to an entered binary information sequence, and a serial-to-parallel converter (a data modulator) 12 converts the channel-encoded data to, e.g., I, Q complex components (symbols) in QPSK by a serial-to-parallel conversion. One IFDMA symbol is composed of Q-number of symbols S0, S1 (Q=2), as illustrated at (a) of FIG. 2.

A symbol compression and repetition unit 13 compresses the time domains of the two symbols S0, S1 that constitute the IFDMA symbol and repeatedly generates each symbol L times [L=4; see (b) of FIG. 2]. In addition, the symbol compression and repetition unit 13 rearranges the repetitive symbol sequence and places the symbols in the same arrangement as that of the symbol sequence S0, S1 [see (c.) of FIG. 2].

A symbol that is the result of compressing the time domain is referred to as a sample (and is also referred to below as a symbol in the repetitive symbol sequence). If we let Tc represent the sample period, the symbol sequence S0, S1 will be repeated at the period Ts=Q×Tc.

A phase rotating unit 14 has a complex multiplier CML that subjects each symbol in the repetitive symbol sequence to user-dependent phase rotation. More specifically, the phase rotating unit 14 varies the amount of phase rotation, which is applied to each symbol, in increments of k·2π/L at the period Ts (=Q×Tc of the repetitive symbol sequence, as indicated at (d) of FIG. 2. Here k, which represents an integer specific to the mobile station, is any one value among 0, 1, 2, ... L−1. A radio transmitter 15 up-converts the frequency of the input signal from the phase rotating unit 1d from baseband frequency to radio frequency, subsequently amplifies the radio-frequency signal and transmits the resultant signal from an antenna.

As indicated at (a) to (c) in FIG. 2, the time domains of the symbols S0, S1 in the transmit symbol sequence are compressed, the symbols are repeated a prescribed number (L=4) of times and the symbols in the repetitive symbol sequence are rearranged so as to have an arrangement identical with that of the symbol sequence S0, S1. As a result, the repetitive symbol sequence after the rearrangement thereof has a comb tooth-shaped spectrum, as illustrated at (f) of FIG. 2. If each symbol in the repetitive symbol sequence after the rearrangement is subjected to phase rotation that varies at a speed that is specific to the mobile station, the spectral positions of the a comb tooth-shaped spectrum will shift, as indicated at (a) to (d) of FIG. 3, in dependence upon k.

In FIG. 3, (a) illustrates the spectrum in a case where amount ω of change in phase rotation every transmit symbol period Ts is 2π/L (k=1), (b) the spectrum in a case where the amount ω of change is 4π/L (k=2), (c) the spectrum in a case where the amount ω of change is 6π/L (k=3) and (d) the spectrum in a case where the amount ω of change is 0 (k=4). Since the frequency spectrum is thus shifted in accordance with k, frequency-division multiplexing transmission is possible.

An NCO (Numerically Controlled Oscillator) 17 calculates a phase rotation amount $\theta_k$ at the intervals of the period Ts (=Tc×Q) of the repetitive symbol sequence, and the complex multiplier CML of the phase rotating unit 14 executes frequency shift processing by subjecting each symbol in the repetitive symbol sequence to phase rotation that is specific to the mobile station. A phase $\theta_k(t)$ that is output from the NCO 17 is given by the following equation:

$$\theta_k(t) = k \cdot 2\pi \frac{W}{L} \cdot t = k \cdot 2\pi \frac{1}{L \cdot Ts} \cdot t \qquad (6)$$

where k, which represents a value that corresponds to the mobile station, is any one value among 0, 1, 2, ... L−1, and W=1/Ts holds. Accordingly, the phase $\theta_k(t)$ that is output-from the NCO 17 increases in increments of k·2π/L at the intervals of the period Ts (=Tc×Q) of the repetitive symbol sequence, and one cycle is formed by the IFDMA period (=4Ts).

The NCO 17 includes a parameter setting unit 20 for setting k and L, of which notification has been given by the base station, in a frequency shifting unit 21. Using the parameters k and L, the frequency shifting unit 21 calculates and outputs the amount ω(=k·2π/L) of change in phase rotation every period Ts of the repetitive symbol sequence. A rotation-phase amount deciding unit 22, which has an adder ADD and a delay unit .DLY for applying a delay time T (=Tc×Q), performs the operation indicated by the following equation:

$$\theta_k(t+1) = \theta_k(t) + \omega \qquad (7)$$

increases the phase-rotation amount $\theta_k$ in increments of ω and outputs the result [see (d) of FIG. 2]. A delay-time setting unit 23 sets the period Ts (=Tc×Q) of the repetitive symbol sequence in the delay unit DLY as the delay time T. A converter 24 calculates I, Q components (x,y) in the complex plane of the phase-rotation amount $\theta_k$ and inputs these components to the phase rotating unit 14. If k=1 holds, the phase-rotation amount $\theta_k$ every Ts will vary in increments of π/2 [see (e) of FIG. 2] and the frequency spectrum will be as indicated at (f) of FIG. 2.

The complex multiplier CML of the phase rotating unit 14 performs calculation according to the following expression:

$$(X+jY) \times (x+jy)$$

and outputs the result of calculation, where symbols (samples) constituting the repetitive symbol sequence are represented by S (=X+jY). In actuality, the complex multiplier CML calculates and outputs (Xx−Yy), (Yy+Yx) for every real-number and imaginary-number part.

Figure 4:
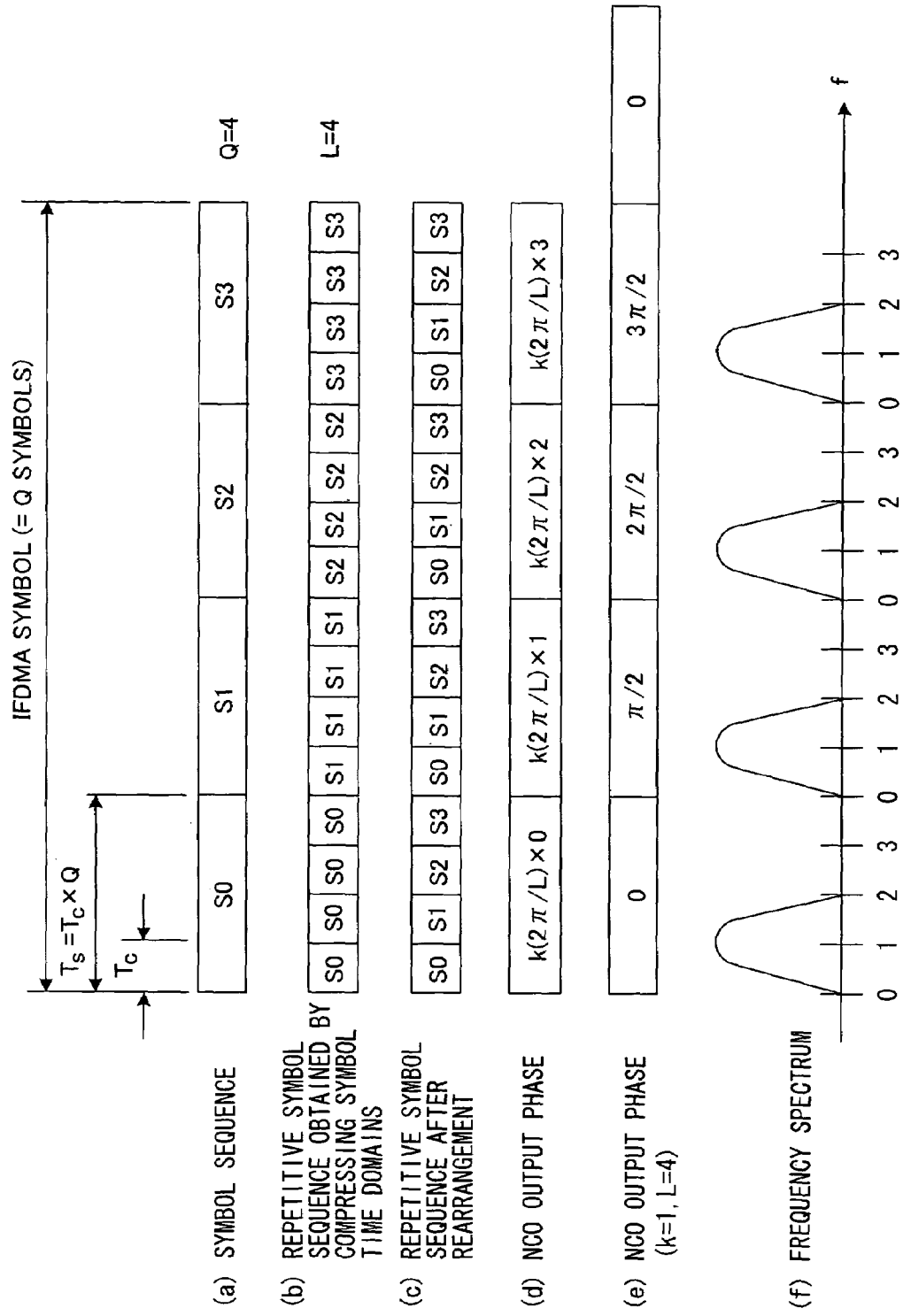
FIG. 4 is a diagram useful in describing the operation of frequency-division multiplexing transmission in a case where Q=4, L=4 holds.

The foregoing is a description of operation of frequency-division multiplexing transmission in a case where Q=2, L=4 holds. Operation in a case where Q=4, L=4 holds is as illustrated in FIG. 4. In FIG. 4, the transmitting apparatus compresses the time domains of each of the symbols S0 to S3 [see (a)] of the transmit symbol sequence, repeats each symbol L=4 times, rearranges the symbols of the obtained repetitive symbol sequence [see (b)] in such a manner that the symbols will have an arrangement identical with the arrangement of the transmit symbol sequence, applies phase rotation, which varies at a speed specific to the mobile station, to each symbol of the repetitive symbol sequence after the rearrangement thereof [see (d)] and transmits the symbols that have undergone the phase rotation. In the rotation of phase, the apparatus varies the amount of phase rotation, which is applied to each symbol of the repetitive symbol sequence, in increments of $k \cdot 2\pi/L$ (where k represents an integer specific to the mobile station). In case of k=1, L=4, the amount of phase rotation is increased in increments of $\pi/2$ at the period of repetition of the repetitive symbol sequence, as indicated at (e).

In accordance with the frequency-division multiplexing transmitting apparatus of the first embodiment, as described above, the frequency spectrum can be shifted by varying k. As a result, even if a plurality of mobile stations access the same base station simultaneously, the frequency spectrum of each mobile station will be orthogonal frequencies and interference among the transmit signals can be reduced.

Further, in accordance with the frequency-division multiplexing transmitting apparatus of the first embodiment, it will suffice to merely vary the amount of phase rotation in increments of $k \cdot 2\pi/L$ at the period $Ts=(Tc \times Q)$ of the repetitive symbol sequence. Therefore, in comparison with the prior art in which the amount of phase rotation is varied in increments of $k \cdot 2\pi/Q \times L$ at the period Tc, computation can be reduced to 1/Q and, as a result, the power consumed by the frequency-division multiplexing transmitting apparatus can be reduced.

Further, in accordance with the frequency-division multiplexing transmitting apparatus of the first embodiment, $k \cdot 2\pi/L$ will suffice for the resolution of the amount of phase rotation and therefore the resolution is increased by a factor of Q in comparison with the resolution $k \cdot 2\pi/Q \times L$ of the amount of phase rotation according to the prior art. As a consequence, the number of quantizations for expressing phase can be reduced to 1/Q and it is possible to reduce the numbers of bits in the complex multiplier CML and NCO of the phase rotating unit. For example, bit-width reductions of 1, 2 and 3 bits can be achieved in the NCO and complex multiplier in case of Q=2, Q=4 and Q=8, respectively.

(b) Frequency-division Receiving Apparatus

Figure 5:
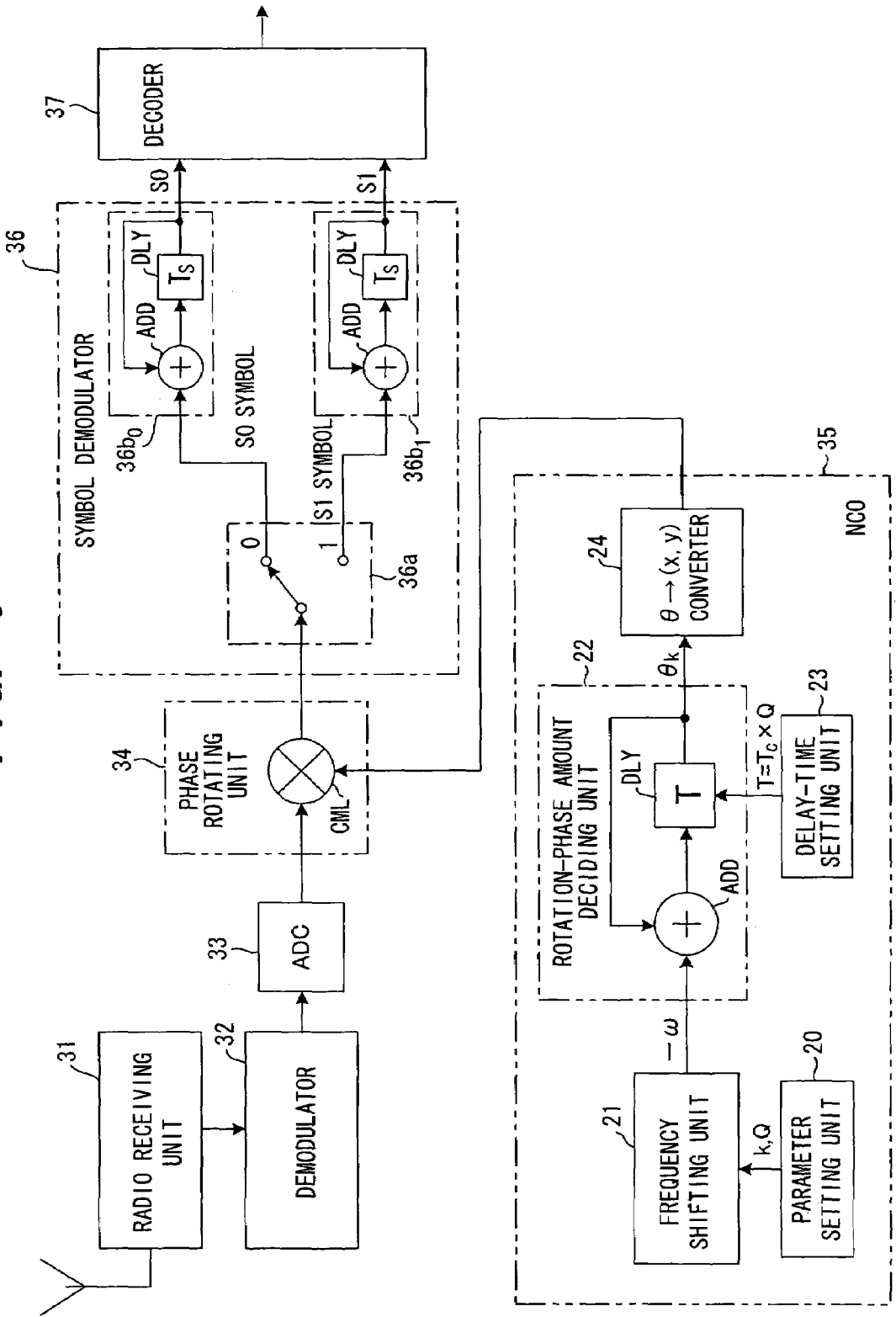
FIG. 5 is a block diagram illustrating a frequency-division multiplexing receiving apparatus according to the first embodiment of the present invention.

FIG. 5 is a block diagram illustrating a frequency-division multiplexing receiving apparatus according to the first embodiment of the present invention. This frequency-division multiplexing receiving apparatus can be utilized as a base station.

A radio receiving unit 31 receives a radio signal and down-converts the frequency thereof to obtain a baseband signal. A demodulator 32 subjects the baseband signal to demodulation processing (e.g., QPSK demodulation) and an AD converter 33 subjects the result of demodulation (symbols) to an analog-to-digital conversion and inputs the digital signal to a phase rotating unit 34. An NCO 35, which has a structure identical with that of the NCO 17 in the frequency-division multiplexing transmitting apparatus, performs the operation indicated by the following equation:

$$\theta_k(t+1) = \theta_k(t) - \omega \qquad (8)$$

at the intervals of the period Ts (=Tc×Q) of the repetitive symbol sequence to thereby rotate the phase rotation amount $\theta_k$ in increments of $-\omega$ in the direction opposite that in the case of transmission.

A complex multiplier CML in the phase rotating unit 34 restores the original phase by subjecting the symbols, which enter from the AD converter 33, to phase rotation in the phase rotation amount $\theta_k$ calculated according to Equation (8) and inputs the repetitive symbol sequence, which is illustrated at (c) of FIG. 2, to a symbol demodulator 36. The latter integrates the symbols S0 of the repetitive symbol sequence to demodulate the transmit symbol S0, integrates the symbols S1 of the repetitive symbol sequence to demodulate the transmit symbol S1, and outputs the demodulated symbols. More specifically, the demodulator 36 has a switch 36a that is switched between output terminals 0 and 1 at the period Tc of symbol repetition. This switching is repeated at the period Ts of the repetitive symbol sequence. The demodulator 36 further includes an integrator $36b_0$ for symbol S0 for integrating the repetitive symbols S0 to demodulate the transmit symbol S0, and an integrator $36b_1$ for symbol S1 for integrating the repetitive symbols S1 to demodulate the transmit symbol S1. A decoder 37 receives the symbols S0, S1 as inputs, applies error-correcting decode processing and inputs the results to a data processor, not shown.

Although only structure corresponding to one mobile station is illustrated in FIG. 5, the phase rotating unit 34, NCO 35 and symbol demodulator 36 are provided for every mobile station.

In accordance with the frequency-division multiplexing receiving apparatus of the first embodiment, it is possible to obtain effects equivalent to those of the frequency-division multiplexing transmitting apparatus.

Figure 6:
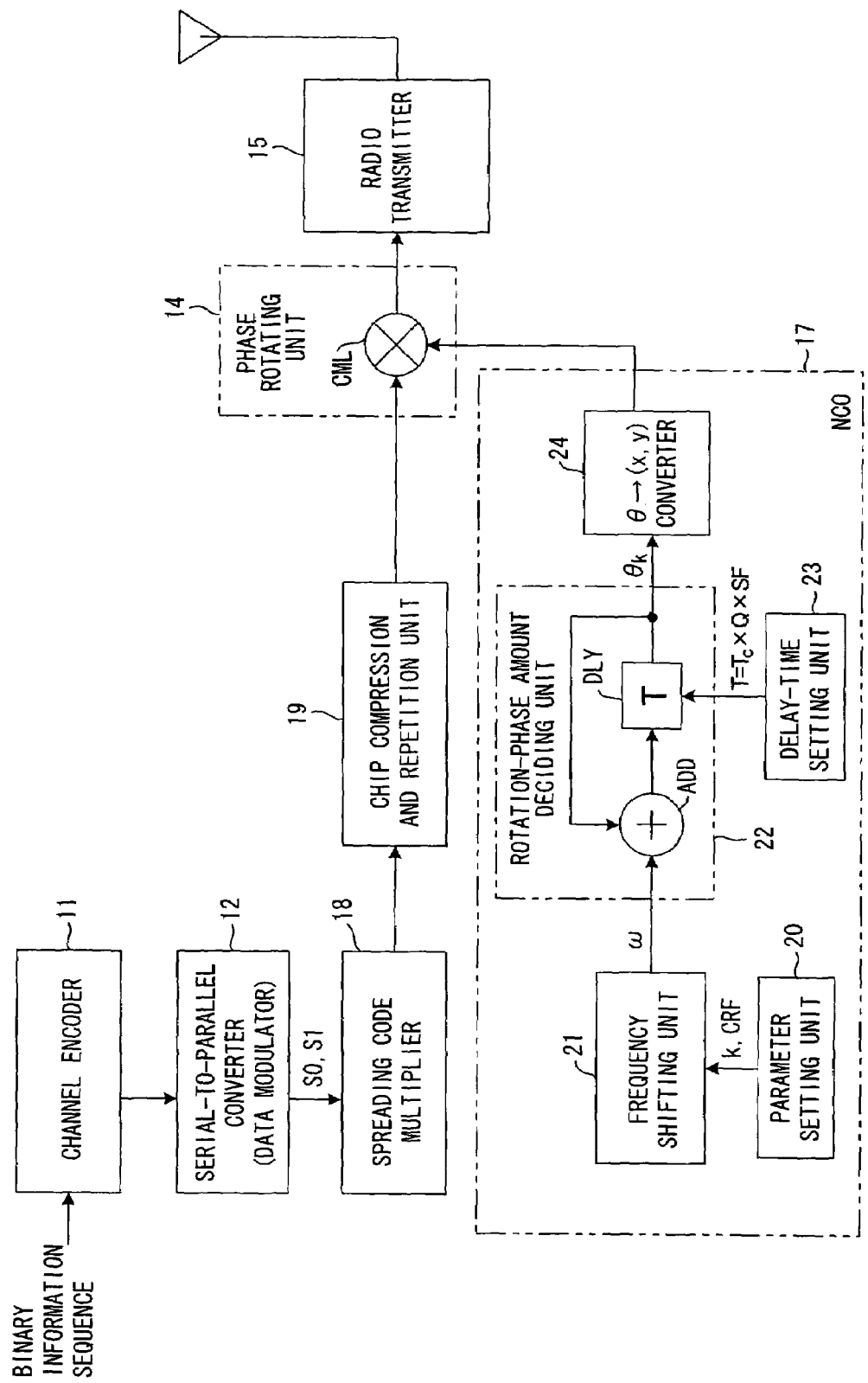
FIG. 6 is a block diagram illustrating a frequency-division multiplexing transmitting apparatus according to a second embodiment of the present invention.
Figure 7:
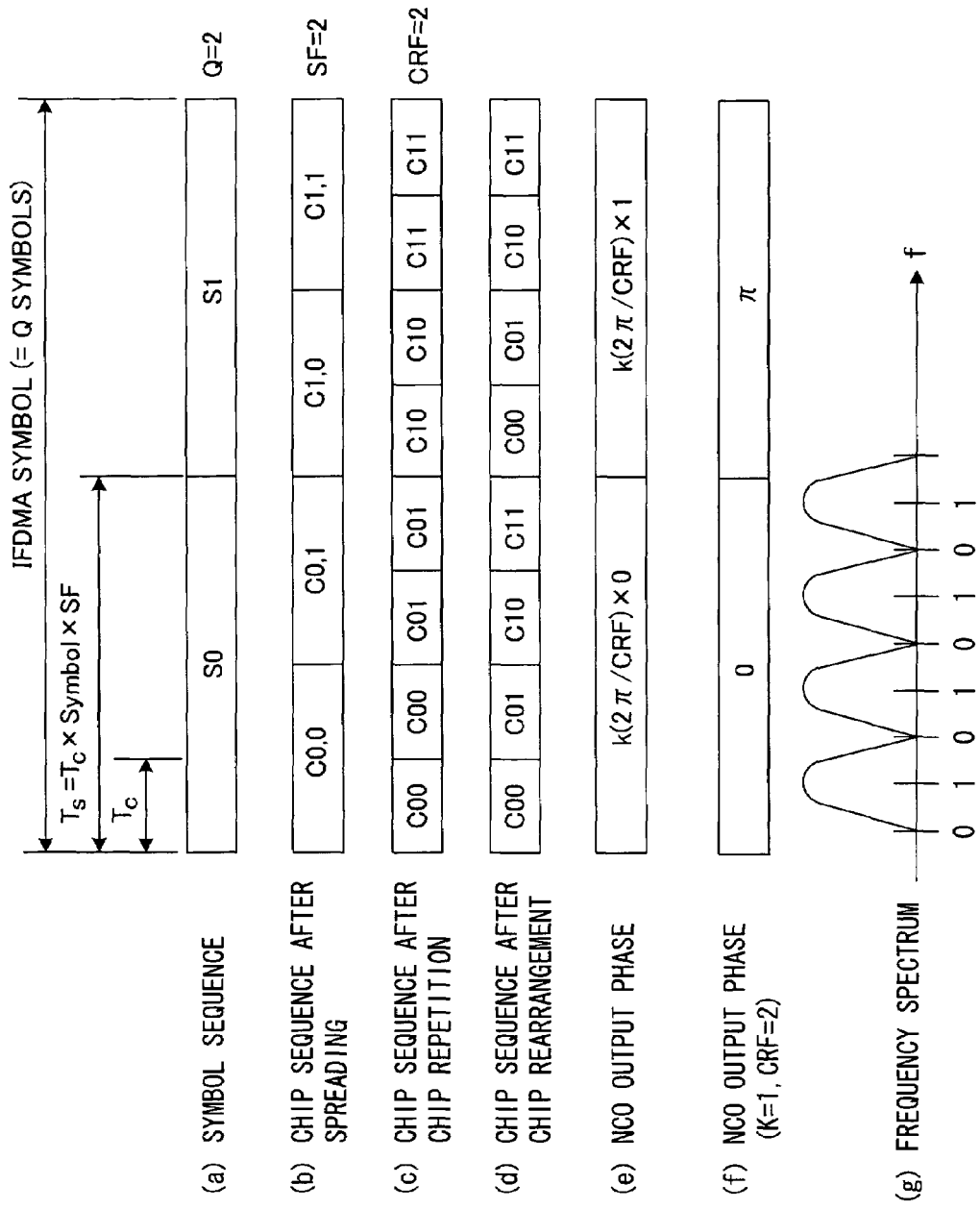
FIG. 7 is a diagram useful in describing the operation of frequency-division multiplexing transmission in a case where Q=2, SF=4, CRF=2 holds.

(B) Second Embodiment (a) Frequency-division Multiplexing Transmitting Apparatus FIG. 6 is a block diagram illustrating a frequency-division multiplexing transmitting apparatus according to a second embodiment of the present invention, and FIG. 7 is a diagram useful in describing the operation of the frequency-division multiplexing transmitting apparatus. The frequency-division multiplexing transmitting apparatus can be utilized as a mobile station.

The frequency-division multiplexing transmitting apparatus in FIG. 6 differs from that of FIG. 1 according of the first embodiment in the following points:

(1) A spreading code multiplier 18 (spreading unit) 18, which multiplies the symbols S0, S1 [see (a) of FIG. 7] by spreading codes c00, c01, c10, c11 to generate a spread chip sequence [see (b) of FIG. 7], is provided at the output of the serial-to-parallel converter 12.

(2) A chip compression and repetition unit 19 is provided instead of the symbol compression and repetition unit 13.

(3) The chip compression and repetition unit 19 compresses the-time domains of the chips in the chip sequence c00, c01, c10, c11, which is output from the spreading unit 18, thereby repeating the chips a prescribed number (=CRF) of times [(c) of FIG. 7], rearranges the chips of the repetitive chip sequence so as to have an arrangement identical with the original arrangement of the chips, and outputs the result [(d) of FIG. 7].

(4) The phase rotating unit 14 varies the amount of phase rotation, which is applied to each chip of the repetitive chip sequence, in increments of k·2π/CRF (where k is an integer that is specific to the mobile station) at the period Ts (=Tc× Q×SF) of the repetitive chip sequence [(e) of FIG. 7].

(5) The NCO 17 outputs the rotation phase amount $\theta_k$ that varies in increments of k·2π/CRF at the period Ts of the repetitive chip sequence.

The channel encoder 11 performs channel encoding by applying error-correcting encoding such as turbo encoding or convolutional encoding to an entered binary information sequence, and the serial-to-parallel converter 12 converts the channel-encoded data to, e.g., I, Q complex components (symbols) in QPSK by a serial-to-parallel conversion. It is assumed that one IFDMA symbol is composed of Q-number of symbols S0, S1 (Q=2), as illustrated at (a) of FIG. 7. The spreading code multiplier 18 multiplies the symbols S0, S1 by the spreading codes c00, c01, c10, c11, thereby spreading them at the spreading factor SF [SF=2 in this illustration] and generating the spread chip sequence [(b) of FIG. 7]. As a result, one IFDMA frame is composed of four (=Q×SF) chips.

The chip compression and repetition unit 19 compresses the time domains of the four chips c00, c01, c10, c11 that constitute the spread chip sequence and repeatedly generates each chip CRF times [CRF=2 in the illustration] [(c) of FIG. 7]. In addition, the chip compression and repetition unit 19 rearranges the repetitive chip sequence and places the chips in an arrangement that is the same as the original chip sequence c00, c01, c10, c11 [(d) of FIG. 7]. The phase rotating unit 14 varies the amount of phase rotation in increments of k·2π/CRF, as illustrated at (e) of FIG. 7, every period Ts of the repetitive chip sequence, thereby rotating the phase of each chip of the repetitive chip sequence. Here k, which represents an integer specific to the mobile station, is any one value among 0, 1, 2, . . . CRF−1.

The radio transmitter 15 up-converts the frequency of the input signal from the phase rotating unit 14 from baseband frequency to radio frequency, subsequently amplifies the radio-frequency signal and transmits the resultant signal from an antenna.

As indicated at (b) to (d) in FIG. 7, the time domains of the chips c00, c01, c10, c11 in the chip sequence are compressed, the chips are repeated a prescribed number of times (CRF=2) and the chips obtained by repetition are rearranged so as to have an arrangement identical with that of the chip sequence. As a result, the repetitive chip sequence after the rearrangement thereof has a comb tooth-shaped spectrum, as illustrated at (g) of FIG. 7. Further, if each chip in the repetitive chip sequence after the rearrangement thereof is subjected to phase rotation that varies at a speed that is specific to the mobile station, e.g., if the amount of phase rotation is varied in increments of k·2π/CRF (where k, which represents an integer specific to the mobile station, is 0 or 1), then the frequency spectrum is shifted and frequency-division multiplexing transmission is possible. In FIG. 7, (f) and (g) represent the amount of phase shift and the frequency spectrum, respectively, in a case where k=1, Q=2, CRF=2 and SF=2 hold.

The NCO 17 calculates the phase rotation amount $\theta_k$ in such a manner that it will vary in increments of k·2π/CRF at the period Ts of the repetitive chip sequence, and the complex multiplier CML of the phase rotating unit 14 executes frequency shift processing by subjecting each symbol in the repetitive symbol sequence to phase rotation in the phase rotation amount $\theta_k$. A phase $\theta_k(t)$ that is output from the NCO 17 is given by the following equation:

$$\theta_k(t) = k \cdot 2\pi \frac{1}{CRF \cdot T_s} \cdot t \tag{9}$$

where k, which represents a value that corresponds to the mobile station, is any one value among 0, 1, 2, . . . CRF−1. Accordingly, the phase $\theta_k(t)$ that is output from the NCO 17 increases in increments of k·2π/CRF at the intervals of the period Ts (=Tc×Q×SF) of the repetitive chip sequence and one cycle is formed by the IFDMA period.

Figure 8:
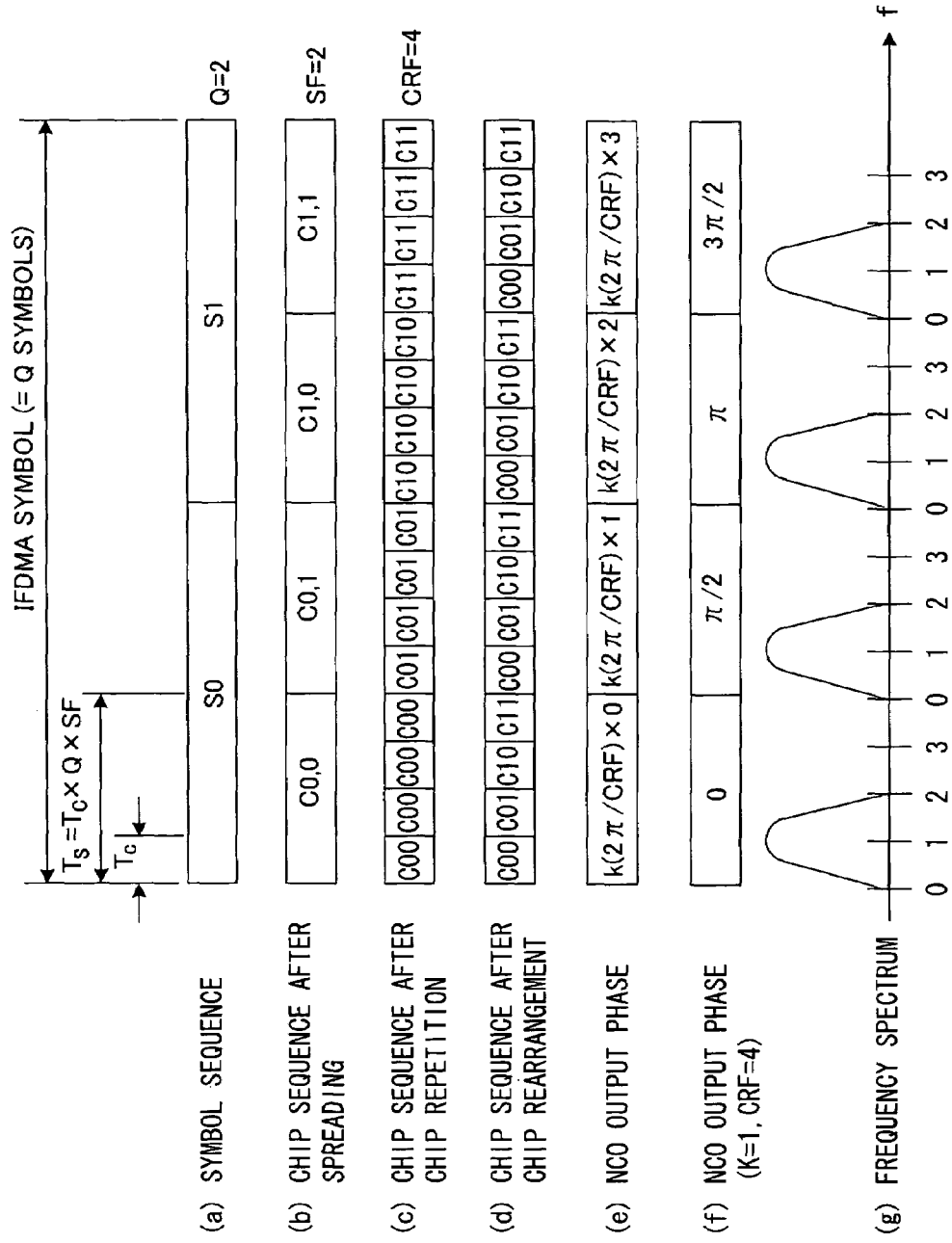
FIG. 8 is a diagram useful in describing the operation of frequency-division multiplexing transmission in a case where Q=2, SF=2, CRF=4 holds.

FIG. 7 is a diagram useful in describing the operation of frequency-division multiplexing transmission in case of Q=2, SF=2 and CRF=2. Operation in a case where Q=2, SF=2 and CRF=4 holds is as illustrated in FIG. 8. In FIG. 8, the transmitting apparatus multiplies the transmit symbols S0, S1 [see (a)] by the spreading codes c00, c01, c10, c11, generates the chip sequence [see (b)], compresses the time domains of each of the chips of the chip sequence, repeats each chip the prescribed number of times CRF (=4) [see (c)] rearranges the chips of the repetitive chip sequence in such a manner that the chips will have an arrangement identical with the original chip arrangement [see (d)], applies phase rotation, which varies at a speed specific to the mobile station, to each chip of the repetitive chip sequence after the rearrangement thereof and transmits the chips that have undergone the phase rotation [see (e)]. In the rotation of phase, the apparatus varies the amount of phase rotation, which is applied to each chip, in increments of k·2π/CRF (where k represents an integer specific to the mobile station) at the period of the repetitive chip sequence. In case of k=1, CRF=4, the amount of phase rotation is increased in increments of π/2 at the period of the repetitive chip sequence, as indicated at (f).

In accordance with the frequency-division multiplexing transmitting apparatus of the second embodiment, effect similar to those of the first embodiment can be obtained.

(b) Frequency-division Receiving Apparatus

Figure 9:
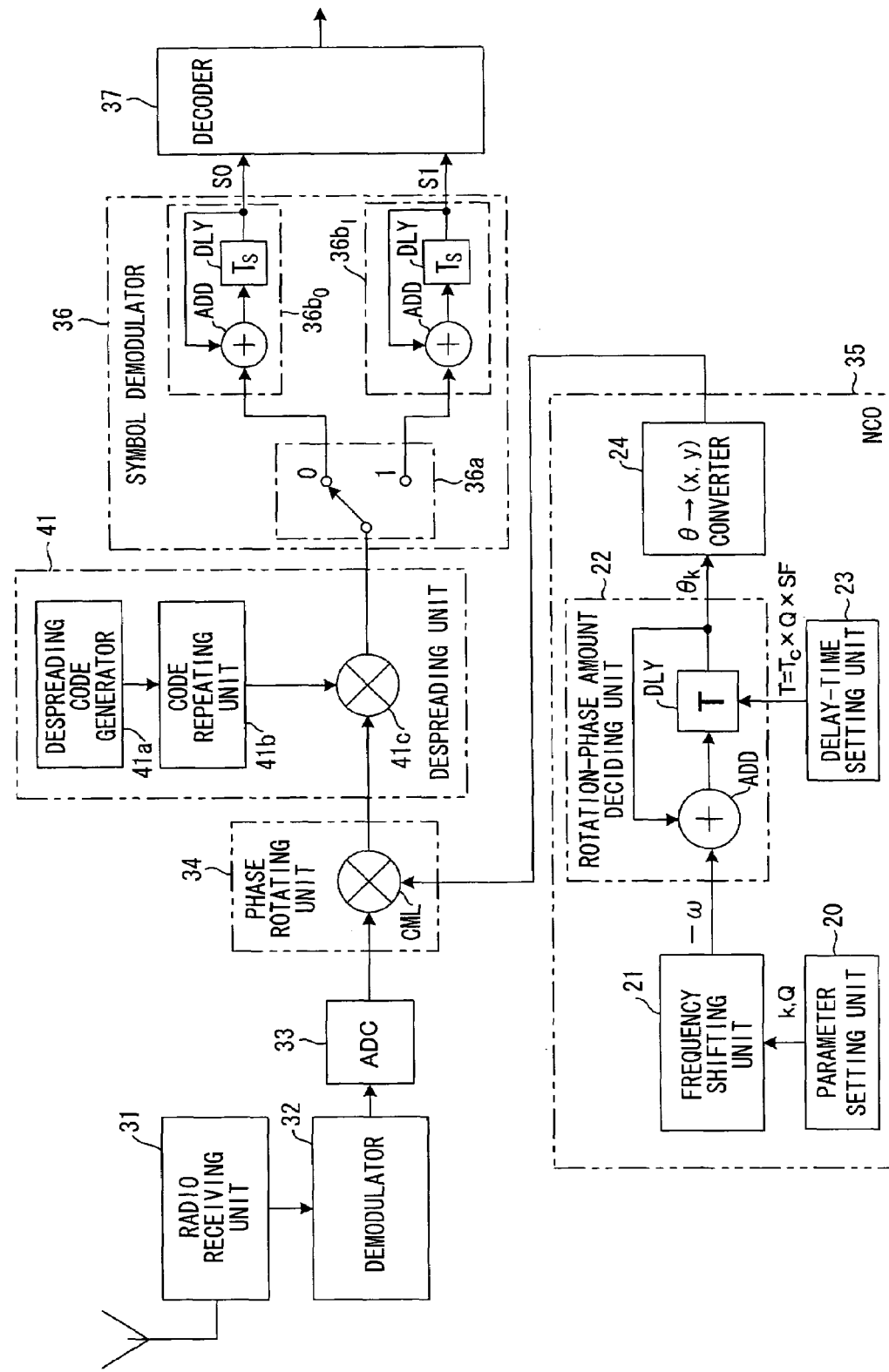
FIG. 9 is a block diagram illustrating a frequency-division multiplexing receiving apparatus according to-the second embodiment of the present invention.

FIG. 9 is a block diagram illustrating a frequency-division multiplexing receiving apparatus according to the second embodiment of the present invention. This frequency-division multiplexing receiving apparatus can be utilized as a base station. Components identical with those of the frequency-division multiplexing receiving apparatus of the first embodiment in FIG. 5 are designated by like reference characters. This embodiment differs in the following points:

(1) A despreading unit 41 is provided at the output of the phase rotating unit 34.

(2) The phase rotating unit 34 varies the amount of phase rotation, which is applied to the demodulated signal, in increments of k·2π/CRF (where k represents an integer specific to the mobile station) every period, Ts of the repetitive chip sequence.

(3) The NCO 35 outputs the rotation phase amount $\theta_k$ that varies in increments of k·2π/CRF at the period Ts of the repetitive chip sequence.

The radio receiving unit 31 receives a radio signal and down-converts the frequency thereof to obtain a baseband signal. The demodulator 32 subjects the baseband signal to, e.g., QPSK demodulation processing and the AD converter 33 subjects the result of demodulation (symbols) to an analogto-digital conversion and inputs the digital signal to the phase rotating unit 34. The NCO 35, which has a structure identical with that of the NCO 17 in the frequency-division multiplexing transmitting apparatus, performs the operation indicated by the following equation:

$$\theta_k(t+1) = \theta_k(t) - \omega \quad (10)$$

at the intervals of the period Ts of the repetitive chip sequence to thereby rotate the phase rotation amount $\theta_k$ in increments of $-\omega$ in the direction opposite that in the case of transmission. That is, the complex multiplier CML in the phase rotating unit 14 applies phase rotation, which is calculated according to Equation (10), to the demodulated signal (symbols) that enters from the AD converter 33 and inputs the result to the despreading unit 41.

The despreading unit 41, which includes a despreading code generator 41a, a code repeating unit 41b and a multiplier 41c, compresses the time domains of despreading codes, thereby repeatedly generating the despreading codes CRF times, multiplies the output of the phase rotating unit by the repeatedly generated despreading codes to thereby effect despreading, and inputs the results of despreading to the symbol demodulator 36.

The symbol demodulator 36 integrates the output of the despreading unit 41 over the interval of the transmit symbol S0 to demodulate the transmit symbol S0, integrates the output of the despreading unit 41 over the interval of the transmit symbol S1 to demodulate the transmit symbol S1, and outputs the demodulated symbols. More specifically, the demodulator 36 has the switch 36a that is switched between output terminals 0 and 1 at the period Ts of the repetitive chip sequence. The integrator 36b₀ for symbol S0 integrates the input signal to demodulate the transmit symbol S0, and the integrator 36b₁ for symbol S1 similarly integrates the input signal to demodulate the transmit symbol S1.

Although only structure corresponding to one mobile station is illustrated in FIG. 9, the phase rotating unit 34, despreading unit 41, NCO 35 and symbol demodulator 36 are provided for every mobile station.

In accordance with the frequency-division multiplexing receiving apparatus of the second embodiment, it is possible to obtain effects equivalent to those of the frequency-division multiplexing transmitting apparatus of the first embodiment.

(B) Third Embodiment (a) Frequency-division Multiplexing Transmitting Apparatus

Figure 10:
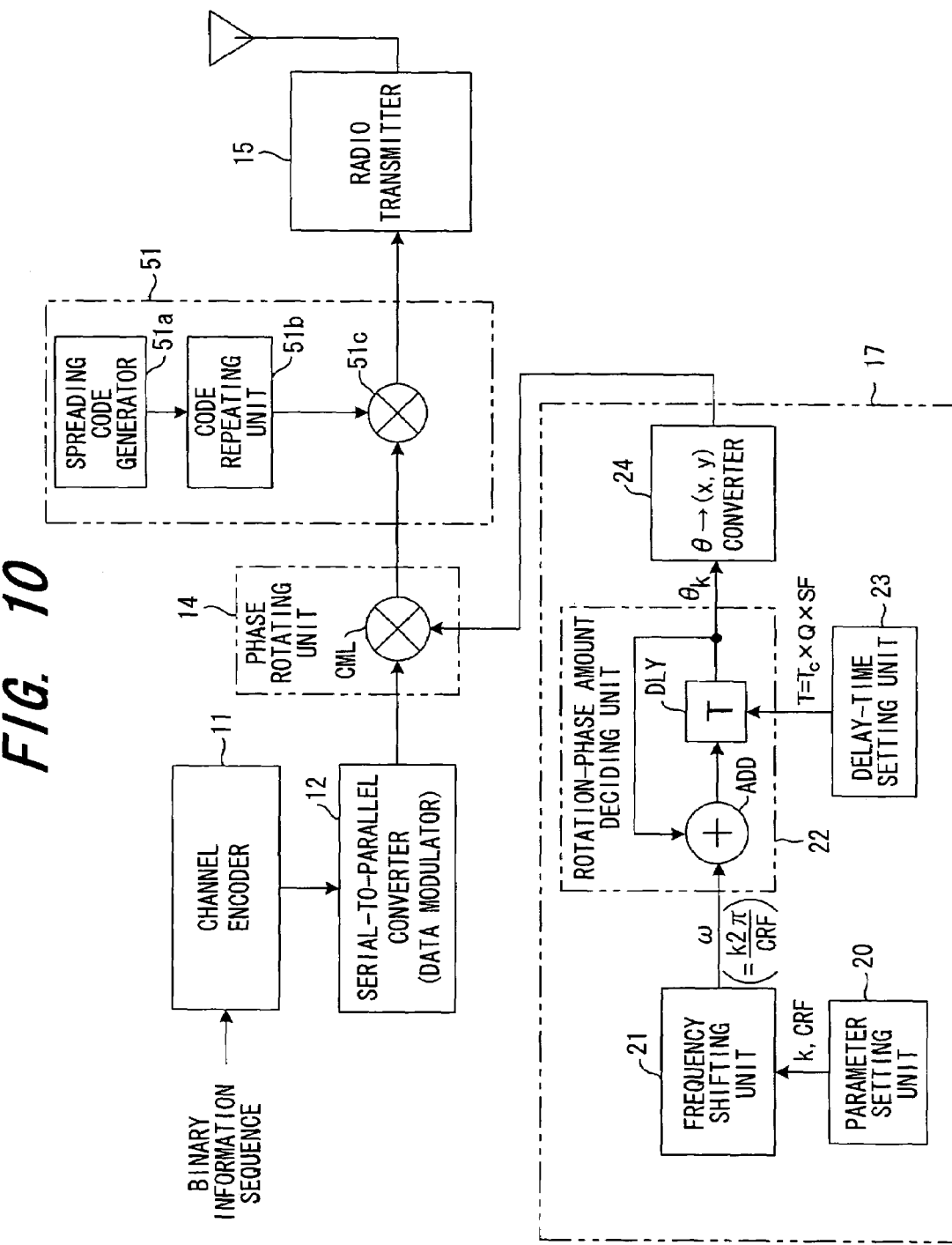
FIG. 10 is a block diagram illustrating a frequency-division multiplexing transmitting apparatus according to a third embodiment of the present invention.
Figure 11:
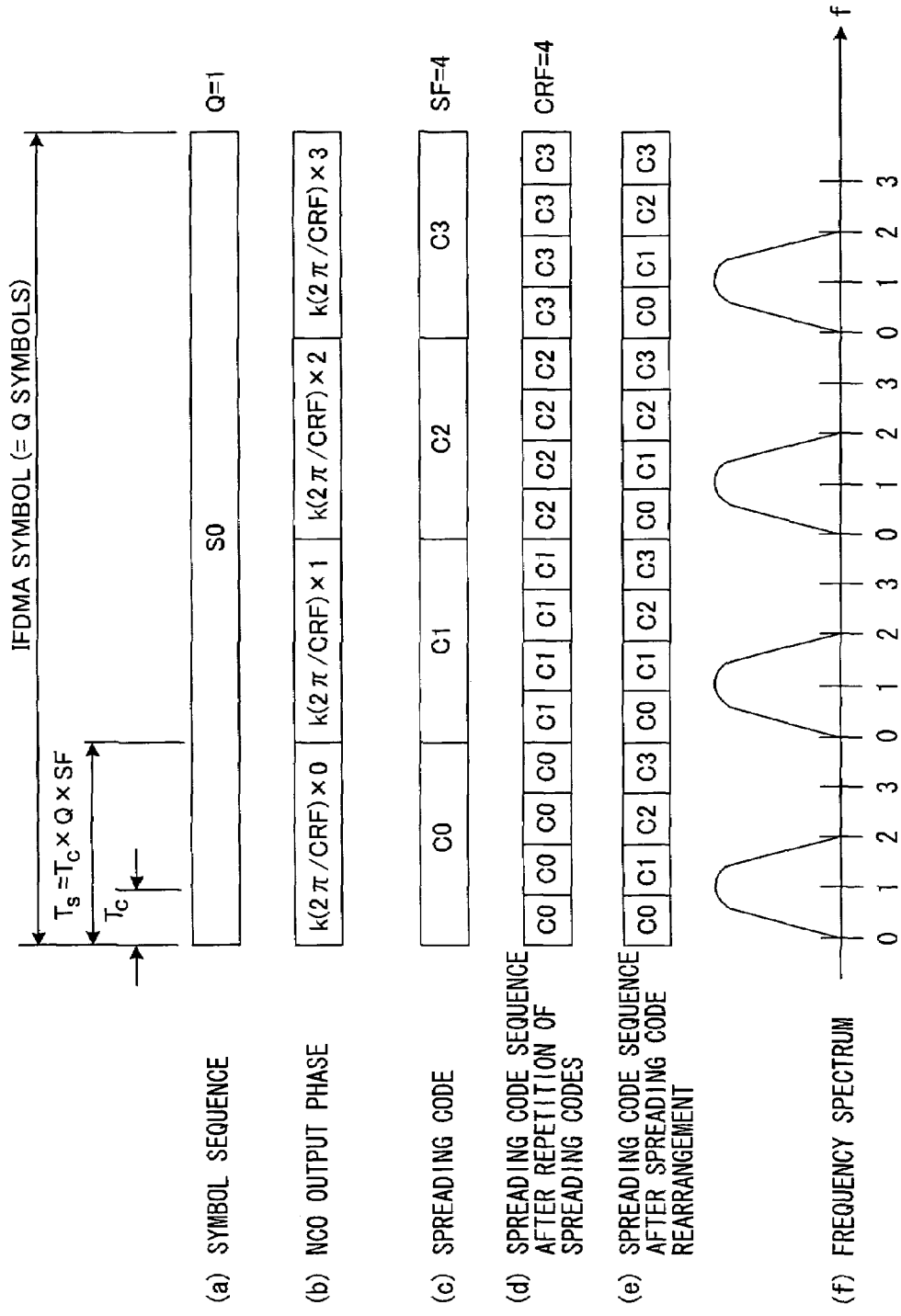
FIG. 11 is a diagram useful in describing the operation of frequency-division multiplexing transmission in a case where Q=1, SF=4, CRF-2 holds.
Figure 12:
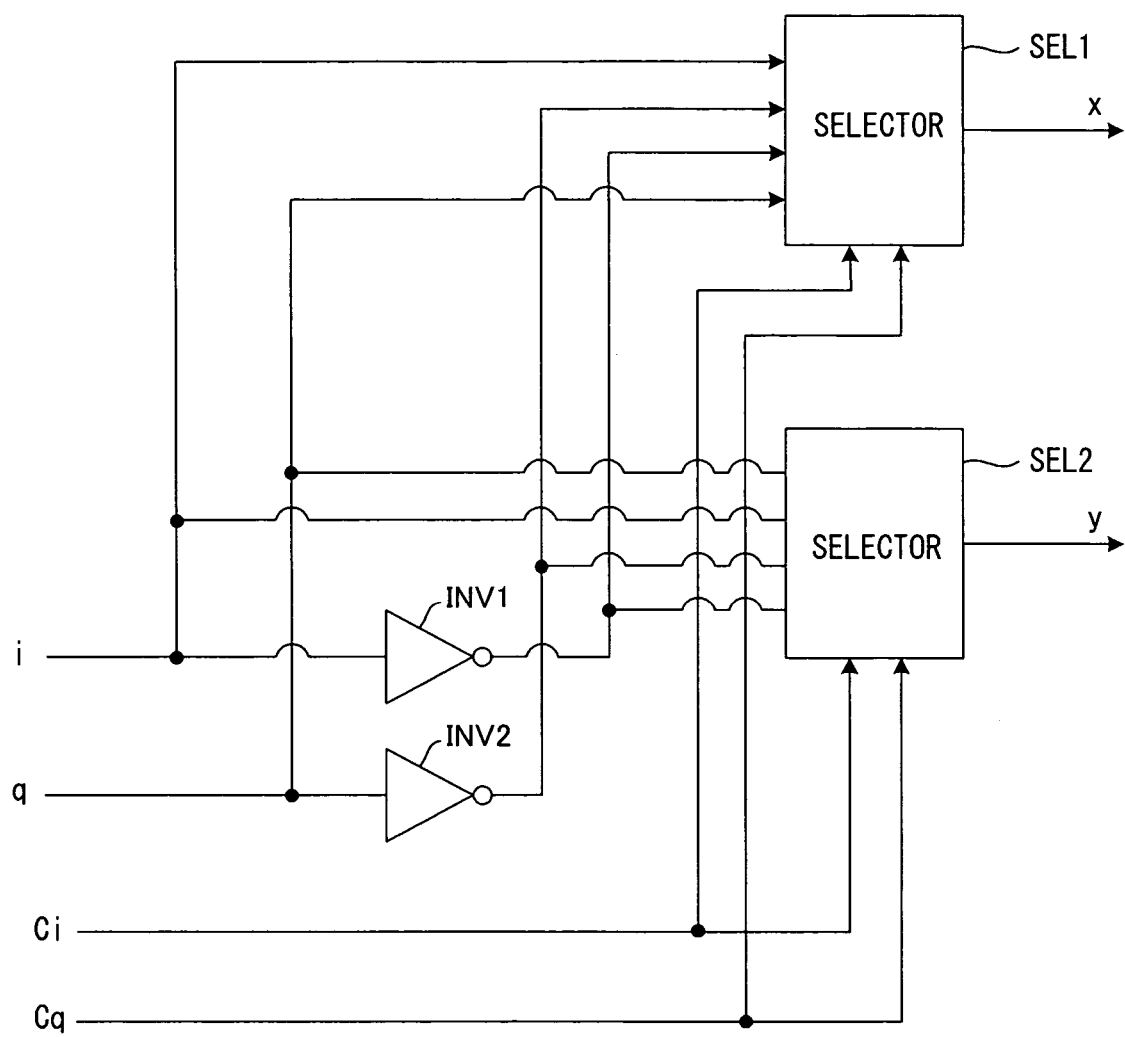
FIG. 12 is a diagram showing the structure of a complex multiplier in a spreading unit.

FIG. 10 is a block diagram illustrating a frequency-division multiplexing transmitting apparatus according to a third embodiment of the present invention, FIG. 11 is a diagram useful in describing the operation of the frequency-division multiplexing transmitting apparatus, and FIG. 12 is a diagram illustrating the structure of a complex multiplier in a spreading unit.

The frequency-division multiplexing transmitting apparatus in FIG. 10 differs from that of FIG. 1 according to the first embodiment in the following points:

(1) The phase rotating unit 14 is provided at the output of the serial-to-parallel converter 12 and varies the amount of phase rotation, which is applied to the transmit symbol S0, in increments of $k \cdot 2\pi/\text{CRF}$ (where k represents an integer specific to the mobile station) at the period Ts (=Tc×Q×SF) of a repetitive spreading code sequence [(b) of FIG. 11].

(2) A spreading unit 51 is provided on the output side of the phase rotating unit 14 and compresses the spreading codes c00, c01, c10, c11, repeatedly generates the spreading codes the prescribed number of times (CRF times) and multiplies the output of the phase rotating unit 14 by the repetitive spreading code sequence.

(3) The NCO 17 outputs the rotation phase amount $\theta_k$ that varies in increments of $k \cdot 2\pi/\text{CRF}$ at the period Ts of the repetitive spreading code sequence.

The channel encoder 11 performs channel encoding by applying error-correcting encoding such as turbo encoding or convolutional encoding to an entered binary information sequence, and the serial-to-parallel converter 12 converts the channel-encoded data to, e.g., I, Q complex components (symbols) in QPSK by a serial-to-parallel conversion. It is assumed that one IFDMA symbol is composed of Q-number of symbols S0 (Q=1), as illustrated at (a) of FIG. 11.

Using the complex multiplier CML, the phase rotating unit 14 subjects the transmit symbol S0 to phase rotation that is specific to the mobile station. More specifically, the rotation phase amount $\theta_k$, which varies in increments of $k \cdot 2\pi/\text{CRF}$ every period Ts of the repetitive spreading code sequence [(e) of FIG. 11] described later, is input from the NCO 17 to the complex multiplier CML of the phase rotating unit 14, and the complex multiplier CML rotates the phase of the transmit symbol S0. Here k represents an integer corresponding to the mobile station.

In a manner similar to that of the second embodiment in FIG. 6, the NCO 17 calculates the phase rotation amount $\theta_k(t)$ every period Ts of the repetitive spreading code sequence according to the following equation and inputs this amount of phase rotation to the phase rotating unit 14:

$$\theta_k(t) = k \cdot 2\pi \frac{1}{\text{CRF} \cdot Ts} \cdot t \quad (11)$$

As a result, the phase $\theta_k(t)$ that is output from the NCO 17 is increased in increments of $k \cdot 2\pi/\text{CRF}$ at the intervals of the period Ts (=Tc×Q×SF) of the repetitive spreading code sequence and one cycle is formed by the IFDMA period (=4Ts).

The spreading unit 51 has a spreading code generator 51a for generating the spreading codes c00, c01, c10, c11 of spreading factor SF =4; a code repeating unit 51b for compressing the time domains of each of the spreading codes and repeatedly generating the spreading code sequence the prescribed number of times over the period of the IFDMA symbol; and a complex multiplier 51c multiplies the symbol S0, which is output from the phase rotating unit 14, by the repetitive spreading code sequence (applies QPSK spreading) and outputs the result of multiplication [(c) to (e) of FIG. 11]. The period Ts of the repetitive spreading code sequence is Tc×Q× SF, as is evident from FIG. 11.

FIG. 12 is a diagram showing the structure of the complex multiplier 51c that performs QPSK spreading. The complex multiplier 51c includes sign inverters INV1, INV2 for inverting the signs of real- and imaginary-number parts of an input symbol (i+jq), and selectors SEL1, SEL2 for selecting (i,q), (q,−i), (−i,−q) and (−q,i) as spreading results (x,y) by spreading codes (ci,cq). QPSK spreading is an operation for applying multiplication according to the following equation to the input symbol (i+jq):

$$\begin{bmatrix} x \\ y \end{bmatrix} = \begin{bmatrix} i \\ q \end{bmatrix} \begin{bmatrix} \cos\theta & \sin\theta \\ -\sin\theta & \cos\theta \end{bmatrix} \quad (12)$$

where $$\theta = k\frac{\pi}{2},$$

k=0, 1, 2, 3

The equation above becomes as follows:
in case of k=0:

$$\begin{bmatrix} x \\ y \end{bmatrix} = \begin{bmatrix} i \\ q \end{bmatrix} \begin{bmatrix} 1 & 0 \\ 0 & 1 \end{bmatrix} = \begin{bmatrix} i \\ q \end{bmatrix};$$

in case of k=1:

$$\begin{bmatrix} x \\ y \end{bmatrix} = \begin{bmatrix} i \\ q \end{bmatrix} \begin{bmatrix} 0 & 1 \\ -1 & 0 \end{bmatrix} = \begin{bmatrix} q \\ -i \end{bmatrix};$$

in case of k=2:

$$\begin{bmatrix} x \\ y \end{bmatrix} = \begin{bmatrix} i \\ q \end{bmatrix} \begin{bmatrix} -1 & 0 \\ 0 & -1 \end{bmatrix} = \begin{bmatrix} -i \\ -q \end{bmatrix}; \text{ and}$$

in case of k=3:

$$\begin{bmatrix} x \\ y \end{bmatrix} = \begin{bmatrix} i \\ q \end{bmatrix} \begin{bmatrix} 0 & -1 \\ 1 & 0 \end{bmatrix} = \begin{bmatrix} -q \\ i \end{bmatrix}.$$

With k=0, 1, 2, 3 corresponding to (1,1), (−1,1), (−1,−1), (1,−1), respectively, of the QPSK spreading codes (ci,cq), the selectors SEL1, SEL2 of the complex multiplier 51c select (i,q), (q,−i), (−i,−q) and (−q,i), which conform to the combination of spreading codes (ci,cq), as (x,y).

The radio transmitter 15 up-converts the frequency of the spread signal, which enters from the spreading unit, from baseband frequency to radio frequency, subsequently amplifies the radio-frequency signal and transmits the resultant signal from an antenna.

The frequency-division multiplexing transmitting apparatus of FIG. 10 represents a case where the positions of the phase multiplying unit and spreading unit are interchanged in comparison with the frequency-division multiplexing transmitting apparatus of FIG. 6. The frequency spectrum of the repetitive chip sequence that is output from the spreading unit 51 therefore has a comb tooth-shaped spectrum, as indicated at (f) of FIG. 11, and the frequency spectrum is shifted by the speed of phase rotation.

Figure 13:
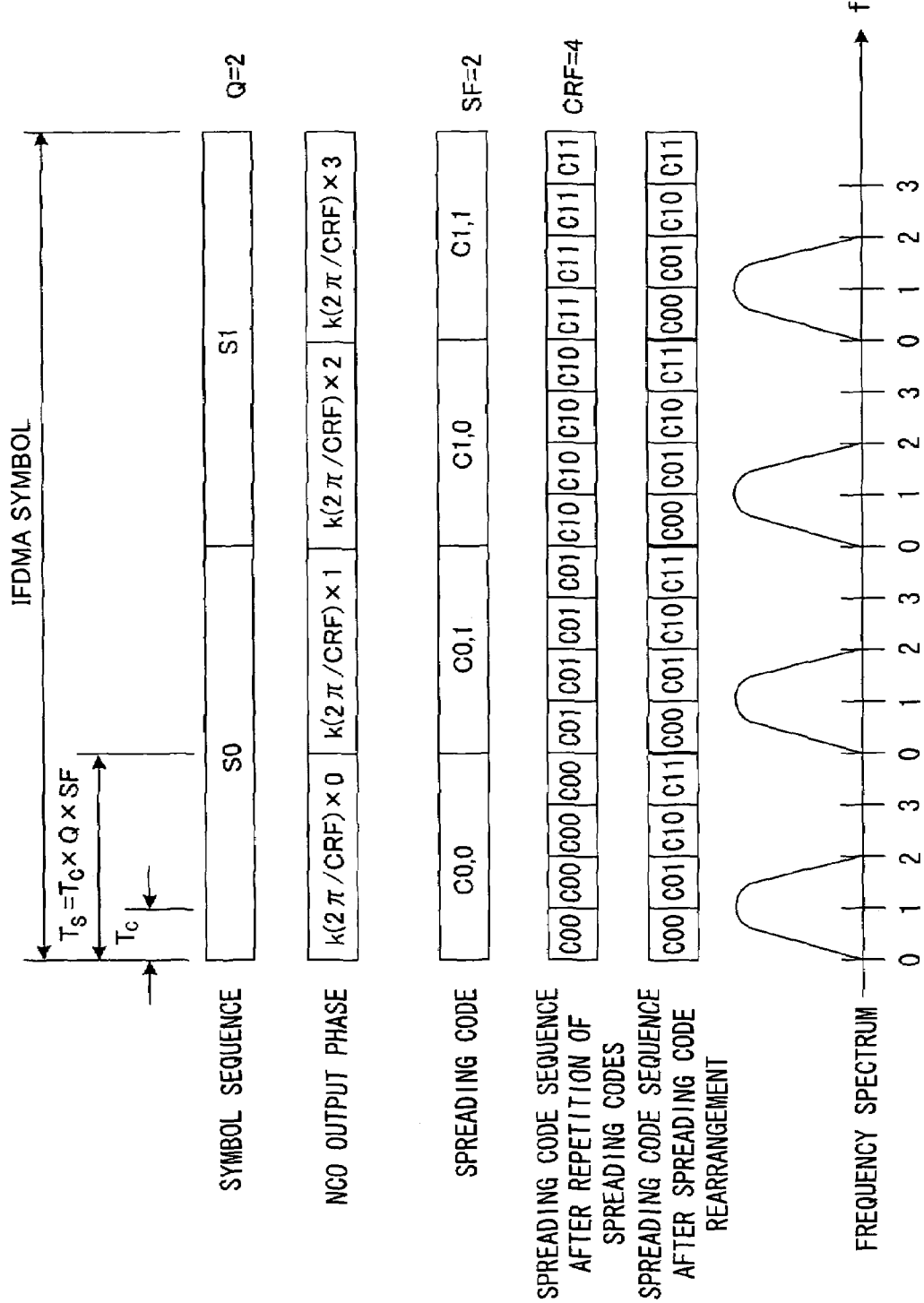
FIG. 13 is a diagram useful in describing the operation of frequency-division multiplexing transmission in a case where Q=2, SF=2, CRF=4 holds.

FIG. 11 is a diagram useful in describing the operation of frequency-division multiplexing transmission in case of Q=1, SF=4 and CRF=4. Operation in a case where Q=2, SF=2 and CRF=4 holds is as illustrated in FIG. 13.

In accordance with the frequency-division multiplexing transmitting apparatus of the third embodiment, effects similar to those of the first embodiment can be obtained.

Further, in accordance with the frequency-division multiplexing transmitting apparatus of the third embodiment, complex multiplication of phase rotation need be performed only every Tc×Q×SF. Therefore, in comparison with the second embodiment in which the complex multiplication of phase rotation is performed at intervals of the chip repetition period Tc, complex multiplication of phase rotation can be reduced to 1/Q×SF.

Further, in accordance with the frequency-division multiplexing transmitting apparatus of the third embodiment, the multiplier of the spreading unit can be implemented by a simple arrangement using selectors, as illustrated in FIG. 12.

(b) Frequency-division Receiving Apparatus

Figure 14:
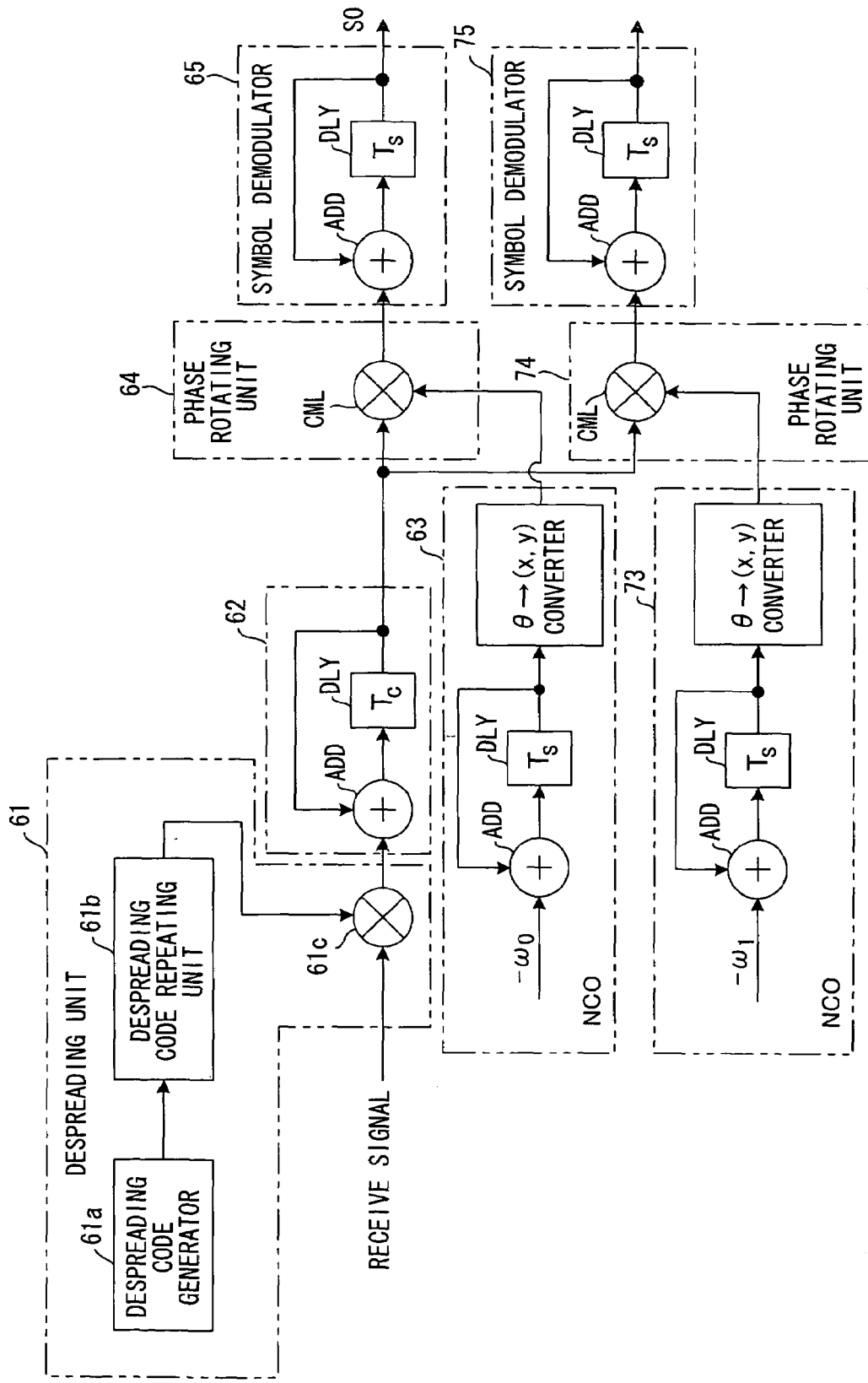
FIG. 14 is a block diagram illustrating the main portions of a frequency-division multiplexing receiving apparatus according to the third embodiment of the present invention.

FIG. 14 is a block diagram illustrating the main portions of a frequency-division multiplexing receiving apparatus according to the third embodiment of the present invention. This is an example in which the apparatus is applied to a case where a signal has been transmitted from a transmitting apparatus in accordance with FIG. 11. Here the apparatus is adapted to demodulate symbols from two mobile stations.

A despreading unit 61, which includes a despreading code generator 61a, a despreading code repeating unit 61b and a multiplier 61c, compresses the time domains of despreading codes c00, c01, c10, c11 that are the same as the spreading codes, thereby repeatedly generating the despreading codes the prescribed number of times (CRF=4 times), multiplies the receive signal by the repetitive despreading code sequence (applies QPSK despreading), and outputs the results of despreading. An integrator 62 constituted by an adder ADD and a delay unit T integrates the despread output over the period Ts of the repetitive spreading code sequence.

An NCO 63 for a user 0 has a structure identical with that of the NCO 17 in the frequency-division multiplexing transmitting apparatus and performs the operation indicated by the following equation:

$$\theta_k(t+1) = \theta_k(t) - \omega_0 \quad (13)$$

at the intervals of the period Ts of the repetitive spreading code sequence to thereby rotate the phase rotation amount $\theta_k$ in increments of $-\omega_0$ in the direction opposite that in the case of transmission. Similarly, an NCO 73 for a user 1 has a structure identical with that of the NCO 17 in the frequency-division multiplexing transmitting apparatus and performs the operation indicated by the following equation:

$$\theta_k(t+1) = \theta_k(t) - \omega_1 \quad (14)$$

at the intervals of the period Ts of the repetitive spreading code sequence to thereby rotate the phase rotation amount $\theta_k$ in increments of $-\omega_1$ in the direction opposite that in the case of transmission.

A phase rotating unit 64 of user 0 applies phase rotation, which is calculated according to Equation (13), to the output of the integrator 62 every period Ts of the repetitive spreading code sequence and inputs the result to a symbol demodulator 65. The symbol demodulator 65, which is constituted by an adder ADD and a delay unit DLY of delay time Ts, sums the phase-rotated output of the integrator 62, which enters every period Ts of the repetitive spreading code sequence, over the interval of the transmit symbol S0, and outputs the result of summation as the result of demodulation of the transmit symbol that was transmitted by user 0.

Similarly, a phase rotating unit 74 of user 1 applies phase rotation, which is calculated according to Equation (14), to the output of the integrator 62 every period Ts of the repetitive spreading code sequence and inputs the result to a symbol demodulator 75. The symbol demodulator 75, which is constituted by an adder ADD and a delay unit DLY of delay time Ts, sums the phase-rotated output of the integrator 62, which enters every period Ts of the repetitive spreading code sequence, over the interval of transmit symbol S0', and outputs the result of summation as the result of demodulation of the transmit symbol that was transmitted by user 1.

In accordance with the frequency-division multiplexing receiving apparatus of the third embodiment, it is possible to obtain effects equivalent to those of the frequency-division multiplexing transmitting apparatus of the first embodiment.

(c) Other Frequency-division Receiving Apparatus

Figure 15:
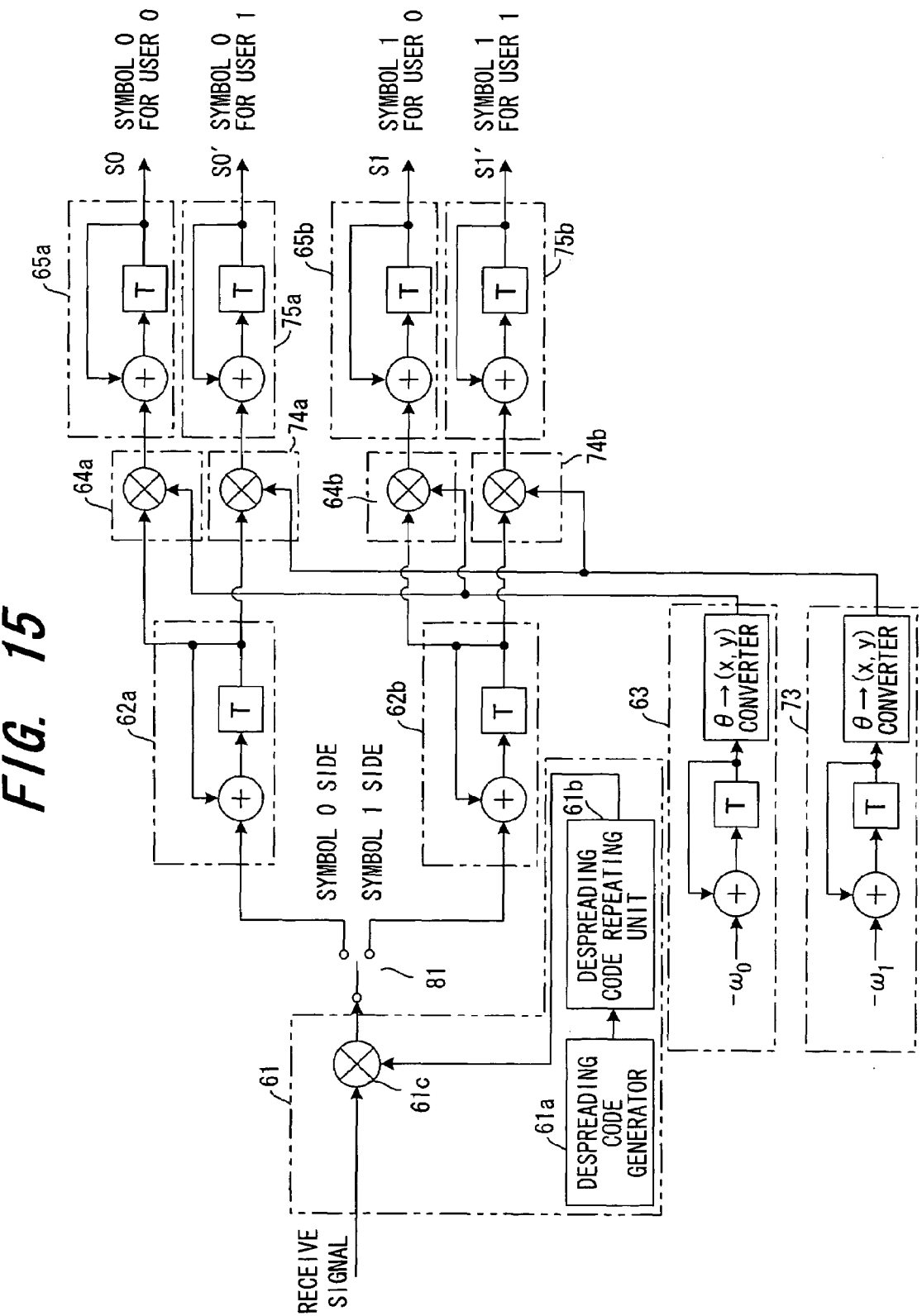
FIG. 15 is a block diagram illustrating the main portions of another frequency-division multiplexing receiving apparatus according to the present invention.
Figure 16:
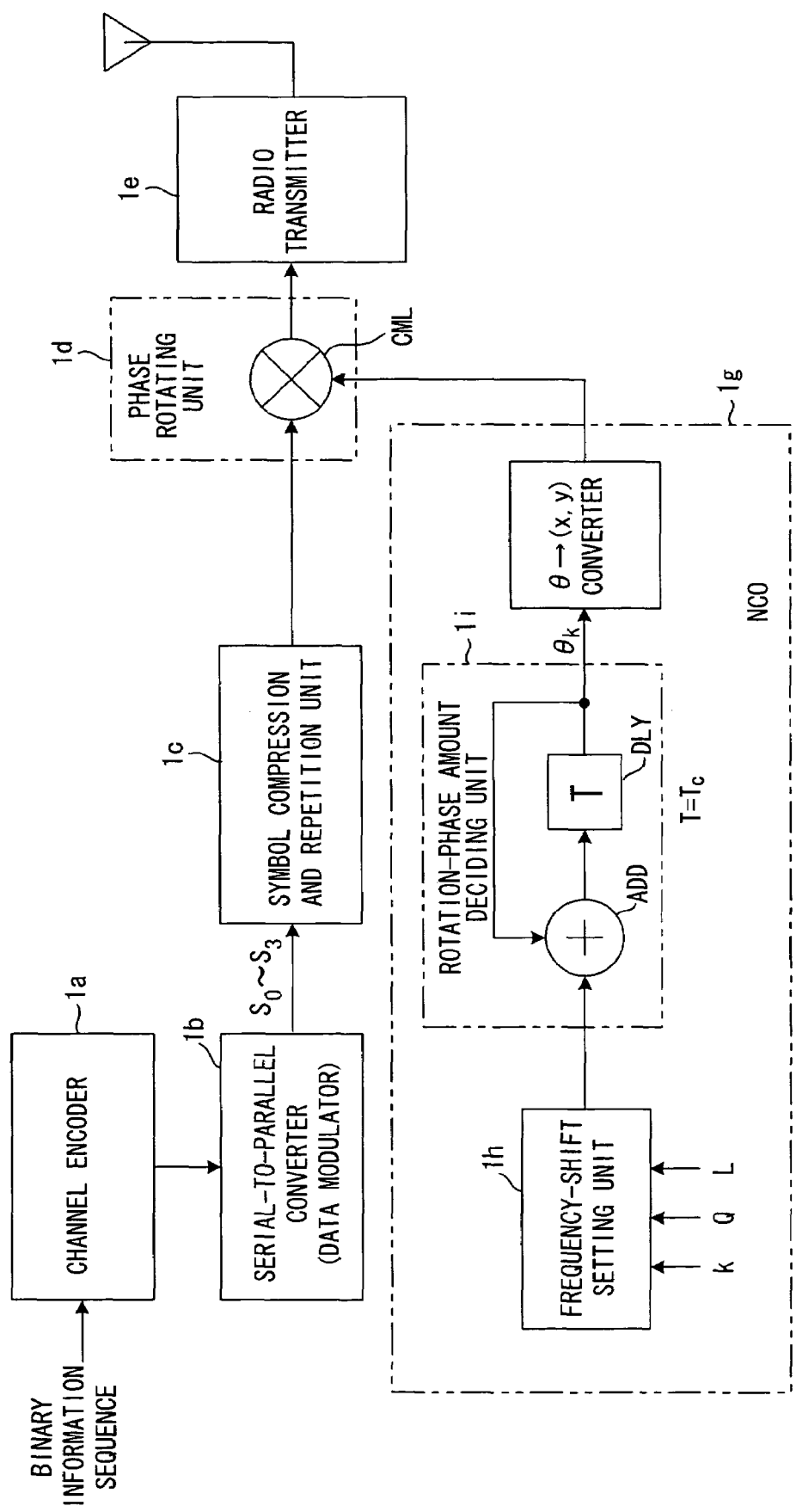
FIG. 16 is a block diagram illustrating the structure of a mobile station that employs an IFDMA modulating scheme.
Figure 17:
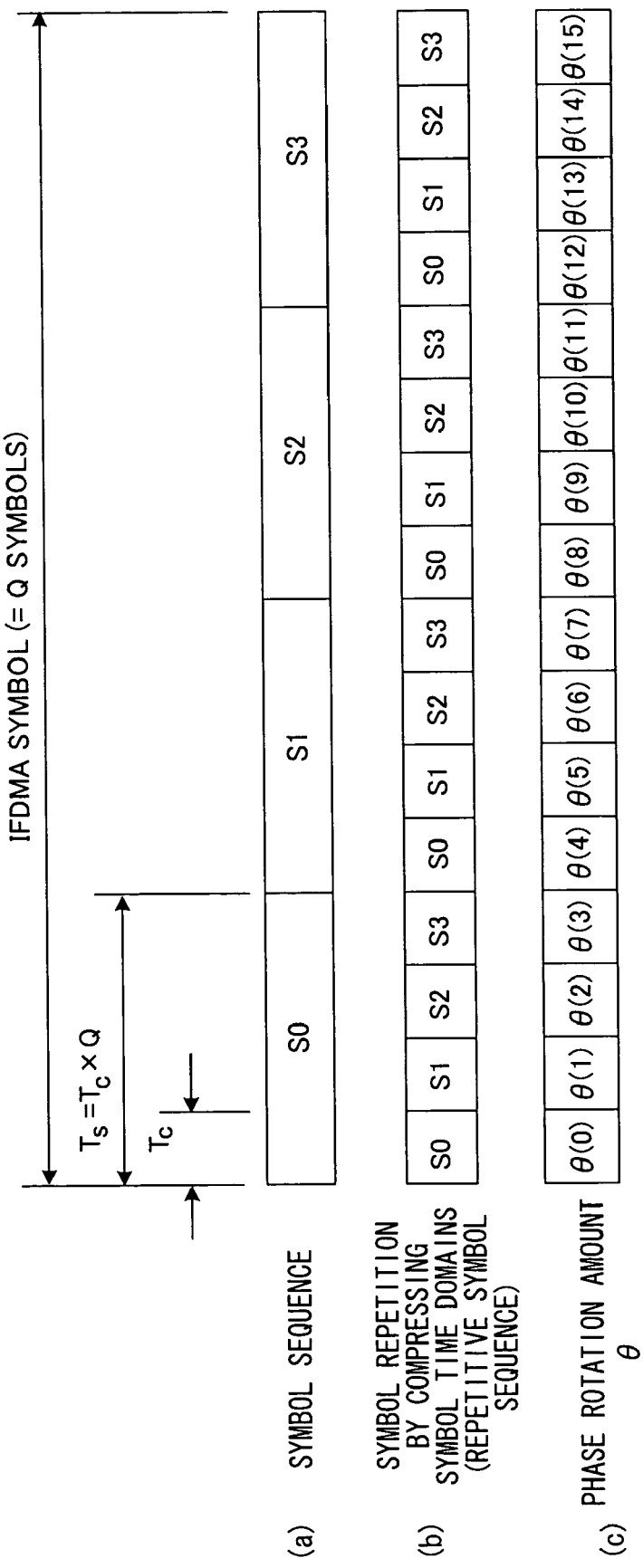
FIG. 17 is a diagram useful in describing an IFDMA symbol.
Figure 18:
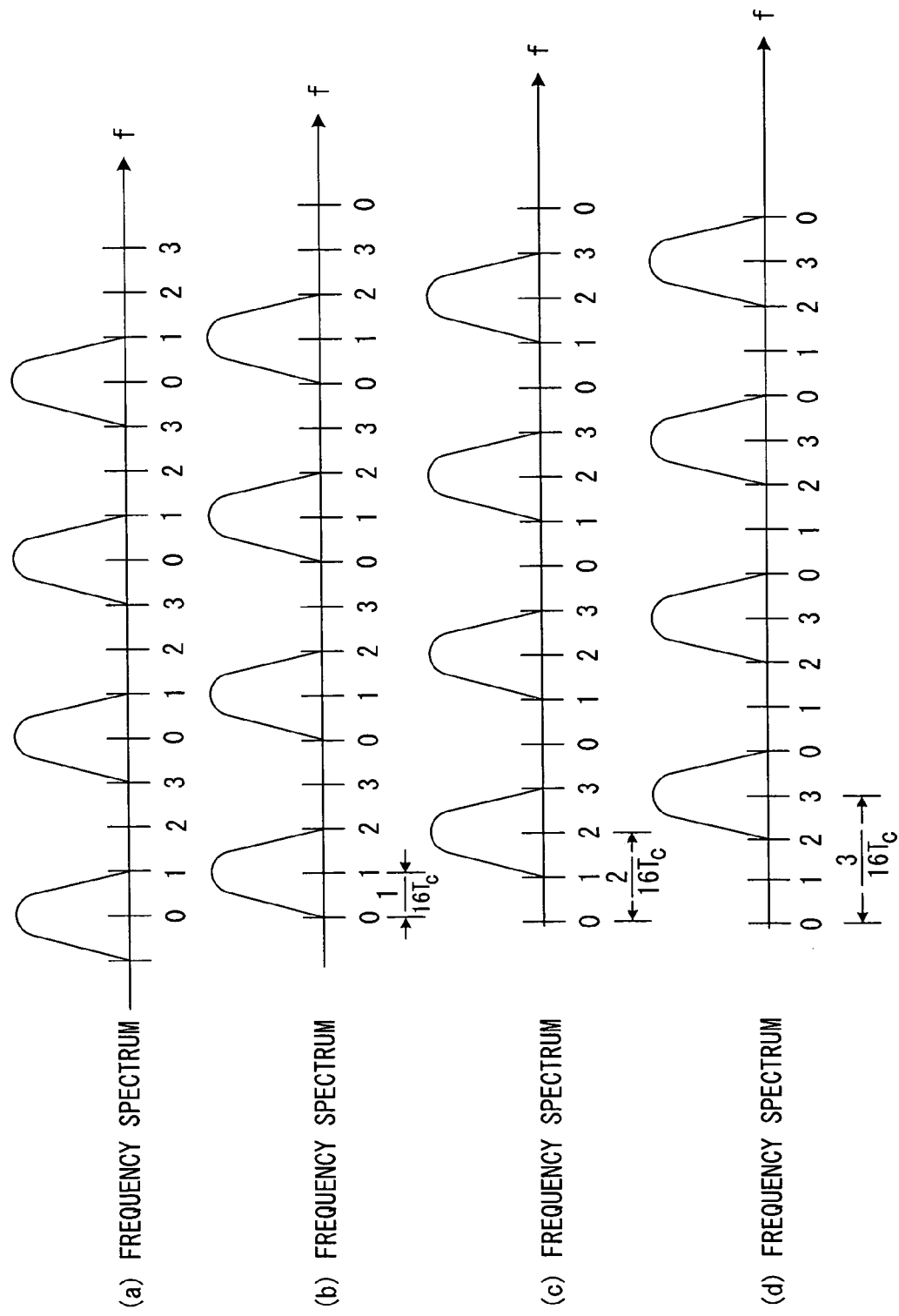
FIG. 18 is a diagram useful in describing frequency spectra of IFDMA modulation.
Figure 19:
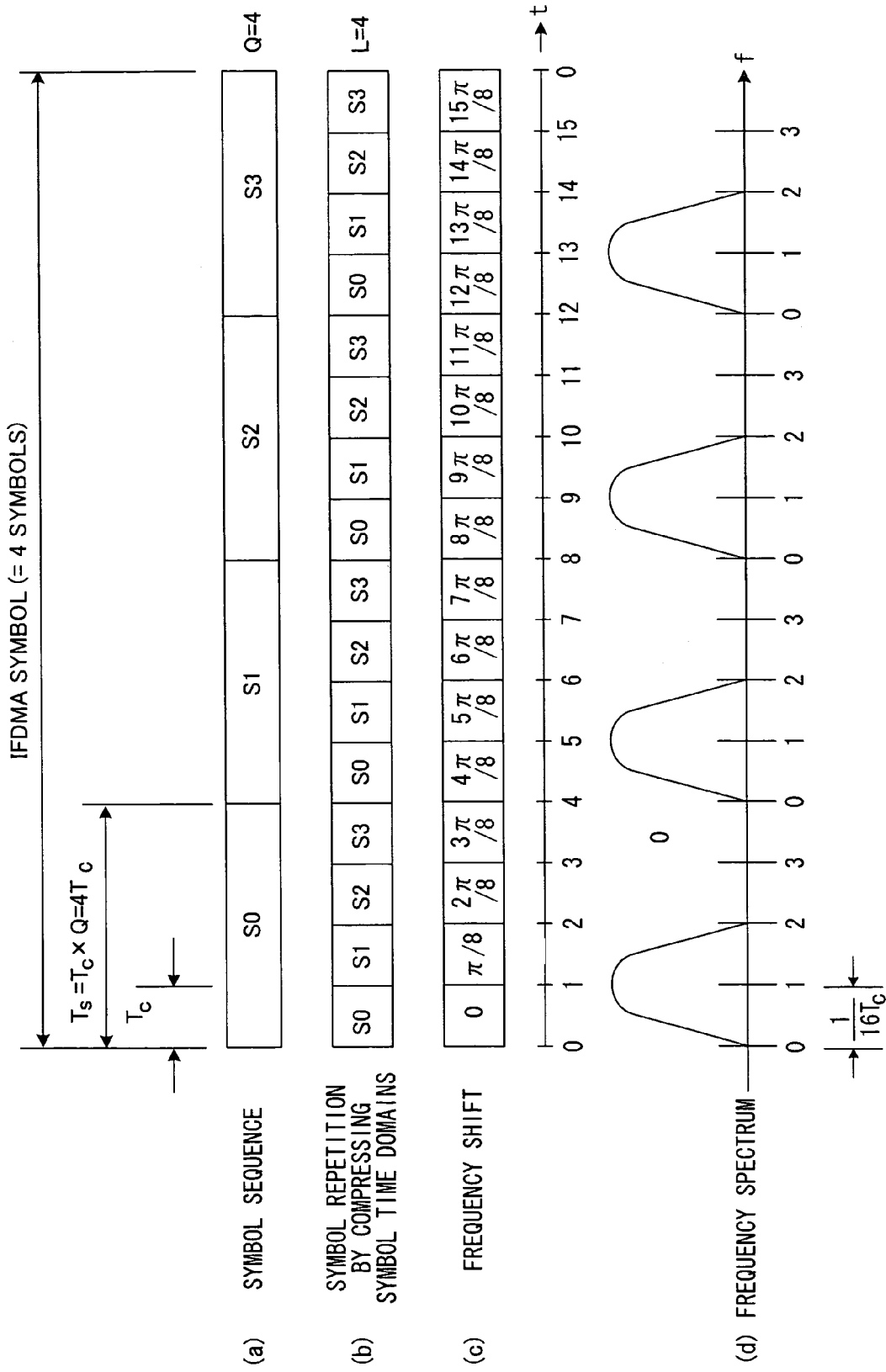
FIG. 19 is a diagram useful in describing a transmitting operation employing IFDMA modulation.
Figure 20:
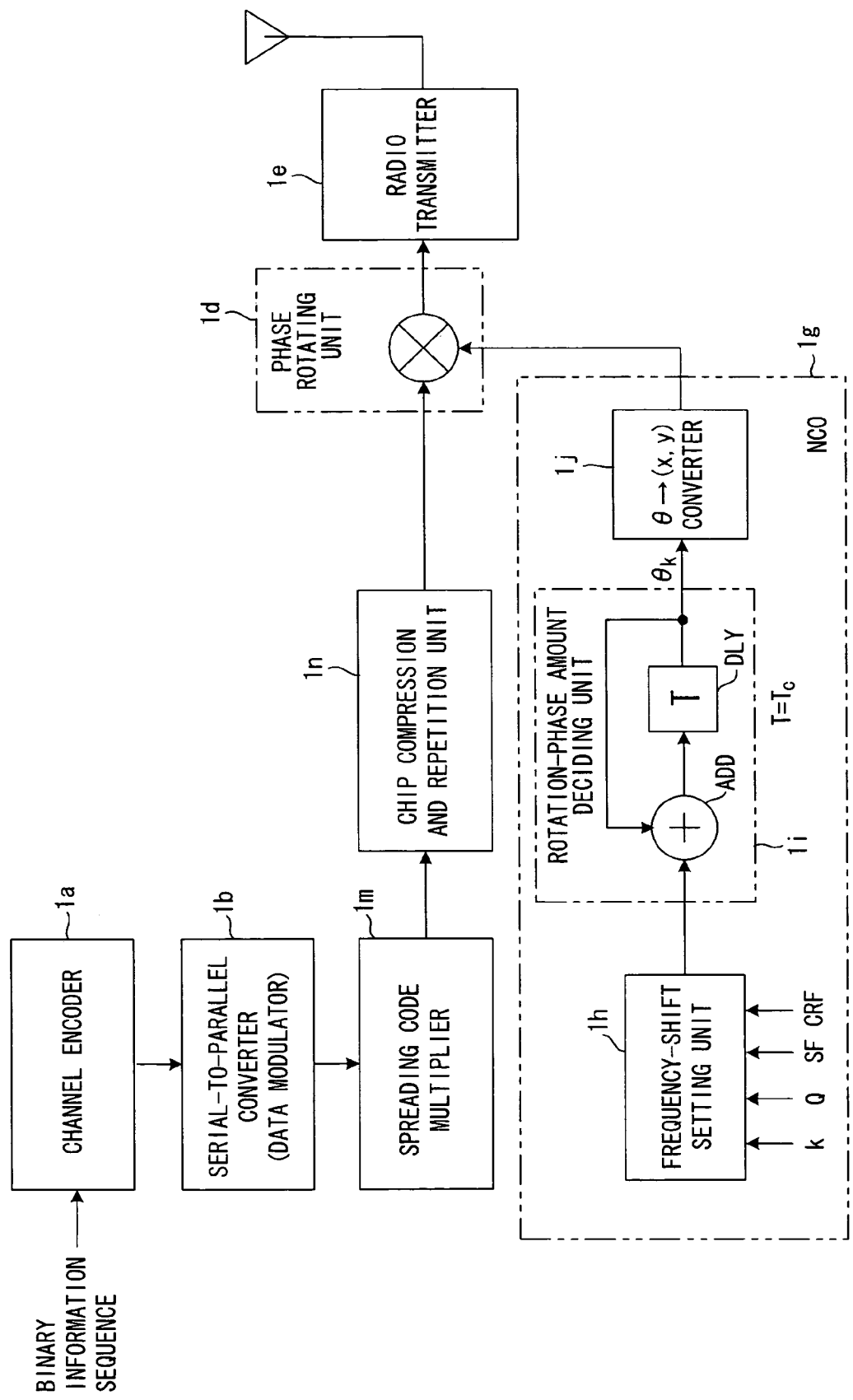
FIG. 20 is a block diagram illustrating another structure of a mobile station that employs an IFDMA modulating scheme.
Figure 21:
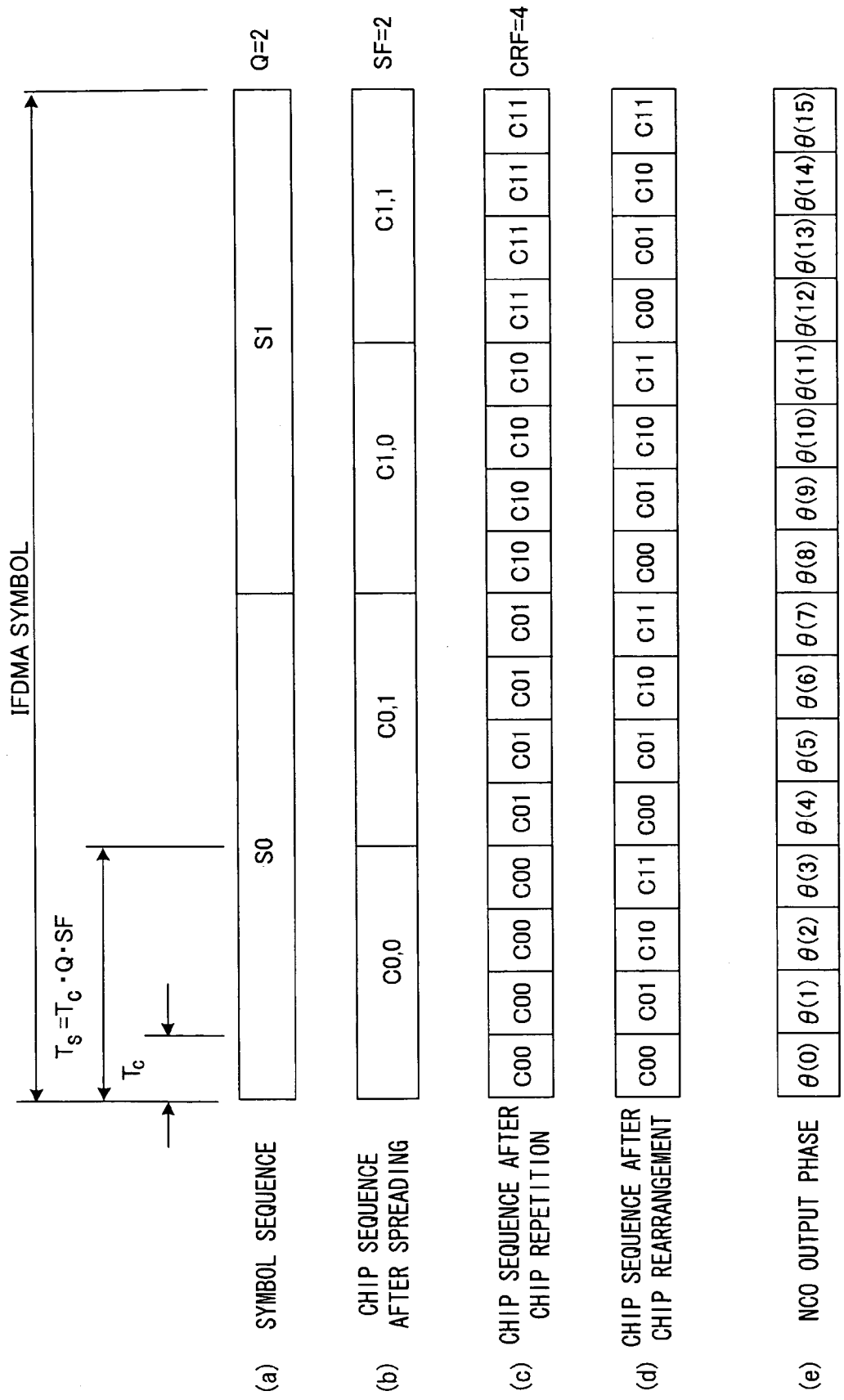
FIG. 21 is a diagram useful in describing another transmitting operation employing IFDMA modulation.

FIG. 15 is a block diagram illustrating the main portions of another frequency-division multiplexing receiving apparatus according to the present invention. This is an example in which the apparatus is applied to a case where a signal has been transmitted from a transmitting apparatus in accordance with FIG. 13. Here the apparatus is adapted to demodulate symbols from two mobile stations.

Although the frequency-division multiplexing receiving apparatus of FIG. 14 need only receive one symbol S0 for user 0 and one symbol S0' for user 1 over the period of the IFDMA symbol, the frequency-division multiplexing receiving apparatus of FIG. 15 must receive two symbols S0, S1 for user 0 and two symbols S0', S1' for user 1 over the period of the IFDMA symbol. Accordingly, with regard to user 0, the frequency-division multiplexing receiving apparatus of FIG. 15 has two integrators 62a, 62b that operate over the intervals of the transmit symbols S0, S1, respectively; a switch 81 for assigning the output of the despreading unit 61 to the integrators 62a, 62b; phase rotating units 64a, 64b for rotating the output phases of the integrators 62a, 62b for transmit symbols S0, S1, respectively; and symbol demodulators 65a, 65b for integrating the outputs of the phase rotating units 64a, 64b to thereby demodulate and output the transmit symbols S0, S1, respectively.

Similarly, with regard to user 1, the frequency-division multiplexing receiving apparatus has two phase rotating units 74a, 74b for the transmit signals S0', S1' for rotating the output phases of the integrators 62a, 62b, respectively; and symbol demodulators 75a, 75b for integrating the outputs of the phase rotating units 74a, 74b to thereby demodulate and output the transmit symbols S0', S1', respectively.

The frequency-division multiplexing receiving apparatus of FIG. 15 demodulates and outputs the transmit signals S0, S1 for user 0 and the transmit signals S0', S1' for user 1 by performing an operation the same as that performed by the frequency-division multiplexing receiving apparatus of FIG. 14 for every transmit symbol.

As many apparently widely different embodiments of the present invention can be made without departing from the spirit and scope thereof, it is to be understood that the invention is not limited to the specific embodiments thereof except as defined in the appended claims.

What is claimed is:

1. A frequency-division multiplexing transmitting apparatus for sending and receiving data by a frequency spectrum specific to a mobile station, comprising:
   symbol compression and repetition unit for compressing a time domain of each symbol of a transmit symbol sequence, repeating the symbol a prescribed number of times (L times) and rearranging the symbols of the obtained repetitive symbol sequence in such a manner that the symbols will have an arrangement identical with the arrangement of the transmit symbol sequence;
   a phase rotating unit for subjecting each symbol of the repetitive symbol sequence after the rearrangement thereof to phase rotation that varies at a speed specific to the mobile station; and
   a transmitting unit for transmitting the symbols that have undergone the phase rotation;
   wherein said phase rotating unit varies the amount of phase rotation, which is applied to each symbol of the repetitive symbols, in increments of k·2π/L (where k represents an integer specific to the mobile station) at the period of the repetitive symbol sequence.

2. The apparatus according to claim 1, wherein said phase rotating unit adopts Tc×Q as the period of the repetitive symbol sequence, where Q represents the number of symbols transmitted in one frame and Tc represents the symbol repetition period.

3. The apparatus according to claim 1, wherein said phase rotating unit includes:
   a rotation phase generator for generating phase that increases in increments of k·2π/L at the period of the repetitive symbol sequence; and
   a complex multiplier for subjecting each symbol of the repetitive symbol sequence to phase rotation that conforms to the phase generated.

4. A frequency-division multiplexing receiving apparatus according to claim 1, comprising:
   a receiving unit for receiving each symbol of a repetitive symbol sequence that has been transmitted from said transmitting apparatus;
   a phase rotating unit for subjecting, on a per-mobile-station basis, the receive symbols to phase rotation that varies in increments of k·2π/L at the period of the repetitive symbol sequence; and
   a demodulator for demodulating transmit symbols by combining identical symbol components that are output from said phase rotating unit at the period of the repetitive symbol sequence.

5. A frequency-division multiplexing transmitting apparatus for transmitting data by a frequency spectrum specific to a mobile station, comprising:
   a spreading unit for multiplying transmit symbols by spreading codes to thereby generate a chip sequence;
   a chip compression and repetition unit for compressing a time domain of each chip of the chip sequence, repeating the chip a prescribed number (=CRF) of times and rearranging the chips of the repetitive chip sequence in such a manner that the chips will have an arrangement identical with the original chip arrangement;
   a phase rotating unit for subjecting each chip of the repetitive chip sequence after the rearrangement thereof to phase rotation that varies at a speed specific to the mobile station; and
   a transmitting unit for transmitting the output of said phase rotating unit;
   wherein said phase rotating unit varies the amount of phase rotation, which is applied to each chip of the repetitive chip sequence, in increments of k·2π/CRF (where k represents an integer specific to the mobile station) at the period of the repetitive chip sequence.

6. The apparatus according to claim 5, wherein said phase rotating unit calculates the period of the repetitive chip sequence according to Tc×SF×Q, where Q represents the number of symbols transmitted in one frame, SF the spreading factor and Tc the chip repetition period.

7. The apparatus according to claim 5, wherein said phase rotating unit includes:

a rotation phase generator for generating phase that increases in increments of k·2π/CRF at the period of the repetitive chip sequence; and a complex multiplier for subjecting each chip of the repetitive chip sequence to phase rotation that conforms to the phase generated.

8. A frequency-division multiplexing receiving apparatus according to claim 5, comprising:

a receiving unit for receiving each chip of a repetitive chip sequence that has been transmitted from said transmitting apparatus;

a phase rotating unit for subjecting, on a per-mobile-station basis, the receive chips to phase rotation that varies in increments of k·2π/CRF at the period of the repetitive chip sequence;

a despreading unit for compressing time domains of despreading codes, thereby repeatedly generating the despreading codes the prescribed number (=CRF) of times, and applying the repeatedly generated despreading codes to the output of said phase rotating unit; and a demodulator for demodulating transmit symbols by combining identical symbol components that have been obtained by the despreading.

9. A frequency-division multiplexing transmitting apparatus for transmitting data by a frequency spectrum specific to a mobile station, comprising:

a phase rotating unit for subjecting transmit symbols to phase rotation that varies at a speed specific to the mobile station;

a spreading unit for compressing time domains of spreading codes, thereby repeatedly generating the spreading codes a prescribed number (=CRF) of times, and multiplying the output of said phase rotating unit by the repeatedly generated spreading codes; and a transmitting unit for transmitting the results of multiplication by the spreading codes;

wherein said phase rotating unit varies the amount of phase rotation, which is applied to the transmit symbols, in increments of k·2π/CRF (where k represents an integer specific to the mobile station) at the period of the repetitive spreading code sequence.

10. The apparatus according to claim 9, wherein said phase rotating unit includes:

a rotation phase generator for generating phase that increases in increments of k·2π/CRF at the period of the repetitive spreading code sequence; and a complex multiplier for subjecting the transmit symbols to phase rotation that conforms to the phase generated.

11. A frequency-division multiplexing receiving apparatus according to claim 9, comprising:

a receiving unit for receiving the signal that has been transmitted from said transmitting apparatus;

a despreading unit for compressing time domains of despreading codes, thereby repeatedly generating the despreading codes the prescribed number (=CRF) of times, and multiplying the receive signal by the repetitive despreading codes;

a phase rotating unit for subjecting, on a per-mobile-station basis, the output of said despreading unit to phase rotation that varies in increments of k·2π/CRF at the period of the repetitive spreading code sequence; and a demodulator for demodulating transmit symbols by combining identical symbol components from among the outputs of said phase rotating unit.

12. A frequency-division multiplexing transmitting method for transmitting data by a frequency spectrum specific to a mobile station, comprising:

a symbol repeating/rearranging step of compressing a time domain of each symbol of a transmit symbol sequence, repeating the symbol a prescribed number of times (L times) and rearranging the symbols of the obtained repetitive symbol sequence in such a manner that the symbols will have an arrangement identical with the arrangement of the transmit symbol sequence;

a phase rotating step of subjecting each symbol of the repetitive symbol sequence after the rearrangement thereof to phase rotation that varies at a speed specific to the mobile station; and a transmitting step of transmitting the symbols that have undergone the phase rotation;

wherein the amount of phase rotation, which is applied to each symbol of the repetitive symbols, is varied at said phase rotating step in increments of k·2π/L (where k represents an integer specific to the mobile station) at the period of the repetitive symbol sequence.

13. The method according to claim 12, wherein said phase rotating step includes the steps of:

generating phase that increases in increments of K·2π/L at the period of the repetitive symbol sequence; and subjecting each symbol of the repetitive symbol sequence to phase rotation that conforms to the phase generated.

14. A frequency-division multiplexing receiving method according to claim 12, comprising:

a receiving step of receiving each symbol of a repetitive symbol sequence that has been transmitted by said transmitting method;

a phase rotating step of subjecting, on a per-mobile-station basis, the receive symbols to phase rotation that varies in increments of k·2π/L at the period of the repetitive symbol sequence; and a demodulating step of demodulating transmit symbols by combining identical symbol components that have undergone phase rotation at the period of the repetitive symbol sequence.

\* \* \* \* \*